United States Patent
Cook

(10) Patent No.: US 10,193,981 B2
(45) Date of Patent: Jan. 29, 2019

(54) INTERNET OF THINGS (IOT) SELF-ORGANIZING NETWORK

(71) Applicant: CenturyLink Intellectual Property LLC, Denver, CO (US)

(72) Inventor: Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 169 days.

(21) Appl. No.: 15/389,753

(22) Filed: Dec. 23, 2016

(65) Prior Publication Data

US 2018/0183874 A1    Jun. 28, 2018

(51) Int. Cl.
| H04L 29/08 | (2006.01) |
| H04L 12/24 | (2006.01) |
| H04W 24/02 | (2009.01) |
| H04W 84/18 | (2009.01) |

(52) U.S. Cl.
CPC .......... *H04L 67/12* (2013.01); *H04L 41/0816* (2013.01); *H04L 41/0886* (2013.01); *H04W 24/02* (2013.01); *H04W 84/18* (2013.01)

(58) Field of Classification Search
CPC . H04L 67/12; H04L 41/0816; H04L 41/0886; H04W 84/18; H04W 24/02
See application file for complete search history.

(56) References Cited

U.S. PATENT DOCUMENTS

| 5,717,955 A | 2/1998 | Swinehart |
| 6,792,319 B1 | 9/2004 | Bilger |
| 7,030,781 B2 | 4/2006 | Jones |
| 7,096,003 B2 | 8/2006 | Joao |

(Continued)

FOREIGN PATENT DOCUMENTS

| CN | 101799987 B | 11/2011 |
| KR | 2015-0128346 A | 11/2015 |

(Continued)

OTHER PUBLICATIONS

International Search Report and Written Opinion prepared by the Korean Intellectual Property Office as International Searching Authority for PCT Intl Patent App. No. PCT/US2016/067938 dated Mar. 31, 2017; 11 pages.

(Continued)

*Primary Examiner* — Kim T Nguyen
(74) *Attorney, Agent, or Firm* — Adsero IP

(57) ABSTRACT

Novel tools and techniques are provided for implementing Internet of Things ("IoT") functionality. In some embodiments, a first IoT-capable device might receive beacon data from each of one or more other IoT-capable devices in a self-organizing network ("SON") of IoT devices, might compare the received beacon data with stored beacon data, and might send at least one first data to a computing system to update the computing system of any changes in the SON (indicating, without limitation, new devices, failed devices, disabled devices, devices that have moved out of range, etc.). The computing system might receive and analyze the at least one first data to determine a status of each IoT-capable device in the SON, might generate control instructions, and might autonomously send the control instructions to at least one of the IoT-capable devices in the SON to improve the functionality of the SON.

26 Claims, 11 Drawing Sheets

(56) References Cited

U.S. PATENT DOCUMENTS

| | | |
|---|---|---|
| 7,397,363 B2 | 7/2008 | Joao |
| 8,000,314 B2 | 8/2011 | Brownrigg |
| 8,296,383 B2 | 10/2012 | Lindahl |
| 8,380,652 B1 | 2/2013 | Francis, Jr. |
| 8,654,936 B1 | 2/2014 | Eslambolchi et al. |
| 8,787,246 B2 | 7/2014 | Brownrigg |
| 8,811,887 B2 | 8/2014 | Dottling et al. |
| 8,976,704 B2 | 3/2015 | Morper |
| 9,210,583 B2 | 12/2015 | Henderson |
| 9,298,410 B2 | 3/2016 | Juchem |
| 9,326,297 B1 | 4/2016 | Farkas |
| 9,432,340 B1 | 8/2016 | Tutt et al. |
| 9,456,276 B1 | 9/2016 | Chhetri |
| 9,832,655 B2 | 11/2017 | Horneman |
| 9,860,677 B1* | 1/2018 | Agerstam ............... H04W 4/70 |
| 9,867,057 B2 | 1/2018 | Yu |
| 9,917,903 B2 | 3/2018 | Clernon |
| 10,069,751 B2 | 9/2018 | Amulothu |
| 2001/0029311 A1 | 10/2001 | Khare |
| 2002/0024450 A1 | 2/2002 | Townsend |
| 2003/0061029 A1 | 3/2003 | Shaket |
| 2004/0083054 A1 | 4/2004 | Jones |
| 2004/0113773 A1 | 6/2004 | Nieters |
| 2004/0160319 A1 | 8/2004 | Joao |
| 2005/0248444 A1 | 11/2005 | Joao |
| 2007/0079113 A1 | 4/2007 | Kulkarni et al. |
| 2007/0087756 A1 | 4/2007 | Hoffberg |
| 2008/0234878 A1 | 9/2008 | Joao |
| 2008/0256008 A1 | 10/2008 | Kwok |
| 2008/0303654 A1 | 12/2008 | Kates |
| 2009/0121860 A1 | 5/2009 | Kimmel |
| 2009/0327910 A1 | 12/2009 | Black |
| 2010/0124332 A1 | 5/2010 | Arena |
| 2010/0217604 A1 | 8/2010 | Baldwin et al. |
| 2010/0325421 A1 | 12/2010 | Park et al. |
| 2011/0106321 A1 | 5/2011 | Cherian |
| 2011/0288684 A1 | 11/2011 | Farlow |
| 2012/0086563 A1 | 4/2012 | Arling |
| 2012/0265370 A1 | 10/2012 | Kim |
| 2012/0320766 A1 | 12/2012 | Sridhar |
| 2013/0074067 A1 | 3/2013 | Chowdhry |
| 2013/0217421 A1 | 8/2013 | Kim |
| 2013/0238326 A1 | 9/2013 | Kim et al. |
| 2014/0018969 A1 | 1/2014 | Forbes |
| 2014/0146905 A1 | 5/2014 | Zavadsky |
| 2014/0162629 A1 | 6/2014 | Tipton |
| 2014/0167931 A1* | 6/2014 | Lee ..................... H04L 12/2818 340/12.5 |
| 2014/0180478 A1 | 6/2014 | Letsky |
| 2014/0188463 A1 | 7/2014 | Noh et al. |
| 2014/0233412 A1 | 8/2014 | Mishra et al. |
| 2014/0343950 A1 | 11/2014 | Simpson et al. |
| 2014/0369336 A1 | 12/2014 | Prakash |
| 2015/0092744 A1 | 4/2015 | Singh |
| 2015/0098385 A1 | 4/2015 | Navalekar |
| 2015/0111589 A1 | 4/2015 | Yavuz |
| 2015/0120502 A1 | 4/2015 | Jung et al. |
| 2015/0124622 A1 | 5/2015 | Kovvali |
| 2015/0249672 A1 | 9/2015 | Burns et al. |
| 2015/0262102 A1 | 9/2015 | Tann |
| 2015/0298654 A1 | 10/2015 | Joao |
| 2015/0350247 A1 | 12/2015 | Adler et al. |
| 2015/0365278 A1 | 12/2015 | Chakrabarti et al. |
| 2016/0006837 A1 | 1/2016 | Reynolds |
| 2016/0021127 A1 | 1/2016 | Yan |
| 2016/0029346 A1 | 1/2016 | Suresh et al. |
| 2016/0080322 A1 | 3/2016 | Prisser |
| 2016/0085594 A1 | 3/2016 | Wang |
| 2016/0187995 A1 | 6/2016 | Rosewall |
| 2016/0195876 A1 | 7/2016 | Mattsson |
| 2016/0212012 A1 | 7/2016 | Young |
| 2016/0212613 A1 | 7/2016 | Huang |
| 2016/0226674 A1 | 8/2016 | Kangshang et al. |
| 2016/0248746 A1 | 8/2016 | James |
| 2016/0277310 A1 | 9/2016 | Challa |
| 2016/0278599 A1 | 9/2016 | Seo |
| 2016/0294828 A1 | 10/2016 | Zakaria |
| 2016/0295364 A1 | 10/2016 | Zakaria |
| 2016/0323271 A1 | 11/2016 | Hinman |
| 2016/0329040 A1 | 11/2016 | Whinnery |
| 2016/0330042 A1 | 11/2016 | Andersen |
| 2016/0352526 A1 | 12/2016 | Adler et al. |
| 2016/0359965 A1 | 12/2016 | Murphy et al. |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0060369 A1 | 3/2017 | Goyal |
| 2017/0085437 A1 | 3/2017 | Condeixa et al. |
| 2017/0093866 A1 | 3/2017 | Ben-Noon |
| 2017/0110784 A1 | 4/2017 | Vermes et al. |
| 2017/0118687 A1 | 4/2017 | Tipton |
| 2017/0134937 A1 | 5/2017 | Miller |
| 2017/0141575 A1 | 5/2017 | Fulton |
| 2017/0150299 A1 | 5/2017 | Coutinho et al. |
| 2017/0171747 A1 | 6/2017 | Britt et al. |
| 2017/0181383 A1 | 6/2017 | Shen |
| 2017/0187807 A1 | 6/2017 | Clernon |
| 2017/0192437 A1 | 7/2017 | Bier |
| 2017/0195318 A1 | 7/2017 | Liu |
| 2017/0195891 A1 | 7/2017 | Smith et al. |
| 2017/0201504 A1 | 7/2017 | Funk |
| 2017/0206900 A1 | 7/2017 | Lee et al. |
| 2017/0237815 A1 | 8/2017 | Arsenault |
| 2017/0253258 A1 | 9/2017 | Bramucci |
| 2017/0279620 A1 | 9/2017 | Kravitz et al. |
| 2017/0300953 A1 | 10/2017 | Kim |
| 2017/0345420 A1 | 11/2017 | Barnett, Jr. |
| 2017/0358025 A1 | 12/2017 | Varma |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0122506 A1 | 5/2018 | Grantcharov |
| 2018/0146412 A1 | 5/2018 | Schwengler |
| 2018/0168464 A1 | 6/2018 | Barnett, Jr. et al. |
| 2018/0178781 A1 | 6/2018 | Funk et al. |
| 2018/0181091 A1 | 6/2018 | Funk et al. |
| 2018/0181094 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1* | 7/2018 | Cella .................... G05B 19/418 |

FOREIGN PATENT DOCUMENTS

| | | |
|---|---|---|
| WO | WO-2009-098676 | 8/2009 |
| WO | WO-2013-058648 | 4/2013 |
| WO | WO-2017-123392 A1 | 7/2017 |

OTHER PUBLICATIONS

International Preliminary Report on Patentability, dated Jul. 26, 2018, 8 pages.

Alexander, Chris, et al., "Improved User Authentication in Off-The-Record Messaging", Pub. 2009, 7 pages.

Bersch, Christian, et al., "Bimanual Robotic Cloth Manipulation for Laundry Folding", Pub. 2011, 7 pages.

Borisov, Nikita, et al., "Off-the-Record Communication, or, Why Not to Use PGP", Pub. 2004, 8 pages.

De Raimondo, Mario, et al., "Secure Off the Record Messaging", Pub. 2005; 9 pages.

Goldberg, Ian, et al., "Multi-Party Off the Record Messaging", Pub. 2007, 11 pages.

International Search Report and Written Opinion prepared by the Korean Intellectual Property Office as International Searching Authority for PCT International Patent Application No. PCT/US2017/034531 dated Aug. 29, 2017; 18 pages.

U.S. Appl. No. 15/675,936; Non-Final Rejection dated Sep. 27, 2017; 14 pages.

(56) References Cited

OTHER PUBLICATIONS

Stedman, Ryan, et al., "A User Study of Off-the-Record Messaging," Symposium on Usable Privacy and Security, Jul. 23-25, 2008, 10 pages.

* cited by examiner

600

INTERNET OF THINGS (IOT) SELF-ORGANIZING NETWORK

CROSS-REFERENCES TO RELATED APPLICATIONS

This application may be related to each of U.S. patent application Ser. No. 14/946,540 (the "'540 Application"), filed on Nov. 19, 2015 by Michael K. Bugenhagen et al. and titled, "Customer Based Internet of Things (TOT)", which claims priority to U.S. Patent Application Ser. No. 62/196, 086 (the "'086 Application"), filed Jul. 23, 2015 by Michael K. Bugenhagen et al. and titled, "Customer Based Internet of Things (TOT)"; U.S. patent application Ser. No. 14/946,548 (the "'548 Application"), filed on Nov. 19, 2015 by Michael K. Bugenhagen et al. and titled, "Customer Based Internet of Things (TOT)—Transparent Privacy Functionality", which claims priority to U.S. Patent Application Ser. No. 62/196, 090 (the "'090 Application"), filed Jul. 23, 2015 by Michael K. Bugenhagen and titled, "Customer Based Internet of Things (TOT)—Transparent Privacy Functionality"; and U.S. patent application Ser. No. 15/084,805 (the "'805 Application"), filed on Mar. 30, 2016 by Tom Funk and titled, "System and Method for Implementing Secure Communications for Internet of Things (TOT) Devices", which claims priority to U.S. Patent Application Ser. No. 62/277, 245 (the "'245 Application"), filed Jan. 11, 2016 by Tom Funk and titled, "IoT Security through Combining TOR Messenger with MQTT or Additional Protocols". This application may be related to U.S. patent application Ser. No. 15/370,764 (the "'764 application"), filed Dec. 6, 2016 by Thomas C. Barnett, Jr. and titled, "Internet of Things (IoT) Human Interface Apparatus, System, and Method", which claims priority to U.S. Patent Application Ser. No. 62/342, 710 (the "'710 application"), filed May 27, 2016 by Thomas C. Barnett, Jr. and titled, "Internet of Things (IoT) Human Interface Apparatus, System, and Method". This application may be related to U.S. patent application Ser. No. 15/385, 667 (the "'667 application"), filed Dec. 20, 2016 by Thomas C. Barnett, Jr. et al. and titled, "Internet of Things (IoT) Personal Tracking Apparatus, System, and Method". This application may also be related to U.S. patent application Ser. No. 62/397,086 (the "'7086 application"), filed Sep. 20, 2016 by Thomas Schwengler et al. and titled, "Universal Wireless Station for Multiple Simultaneous Wireless Services" and U.S. Patent Application Ser. No. 62/403,878 (the "'878 application"), filed Oct. 4, 2016 by Thomas Schwengler et al. and titled, "Universal Wireless Station for Multiple Simultaneous Wireless Services".

This application may also be related to each of U.S. patent application Ser. No. 14/678,208 (the "'208 application"), filed Apr. 3, 2015 by Michael J. Fargano et al. and titled, "Network Functions Virtualization Interconnection Gateway", which claims priority to U.S. Patent Application Ser. No. 61/974,927, filed Apr. 3, 2014 by Michael J. Fargano and titled, "Network Functions Virtualization Interconnection Gateway"; U.S. patent application Ser. No. 14/678,280 (the "'280 application"), filed on Apr. 3, 2015 by Michael J. Fargano et al. and titled, "Network Functions Virtualization Interconnection Hub", which claims priority to U.S. Patent Application Ser. No. 61/974,930, filed Apr. 3, 2014 by Michael J. Fargano and titled, "Network Functions Virtualization Interconnection Hub"; and U.S. patent application Ser. No. 14/678,309 (the "'309 application"), filed Apr. 3, 2015 by Michael J. Fargano et. al and titled, "Customer Environment Network Functions Virtualization (NFV)", which claims priority to U.S. Patent Application Ser. No. 61/976,896, filed Apr. 8, 2014 by Michael J. Fargano and titled, "Customer Environment Network Functions Virtualization (NFV)" and U.S. Patent Application Ser. No. 61/977, 820, filed Apr. 10, 2014 by Michael J. Fargano and titled, "Customer Environment Network Functions Virtualization (NFV)".

This application may be related to each of U.S. patent application Ser. No. 14/730,695 (the "'695 application"), filed Jun. 4, 2015 by Charles I. Cook et al. and titled, "Remoting Application Servers", which claims priority to U.S. Patent Application Ser. No. 62/037,096, filed Aug. 13, 2014 by Charles I. Cook et al. and titled, "Remoting Application Servers"; U.S. patent application Ser. No. 14/983,884 (the "'884 application"), filed Dec. 30, 2015 by Kevin M. McBride et al. and titled, "Intent-Based Services Orchestration", which claims priority to U.S. Patent Application Ser. No. 62/233,911, filed Sep. 28, 2015 by Kevin M. McBride et al. and titled, "Intent-Based Services Orchestration" and U.S. Patent Application Ser. No. 62/247,294, filed Oct. 28, 2015 by Kevin M. McBride et al. and titled, "Intent-Based Services Orchestration"; and U.S. patent application Ser. No. 14/983,758 (the "'758 application"), filed Dec. 30, 2015 by Michael K. Bugenhagen and titled, "Virtual Machine-To-Port Peripheral Device Driver", which claims priority to U.S. Patent Application Ser. No. 62/237, 981, filed Oct. 6, 2015 by Michael K. Bugenhagen and titled, "NFV Peripheral Network Driver for VNF's".

This application may also be related to each of U.S. patent application Ser. No. 15/148,688 (the "'688 application"), filed on May 6, 2016 by Charles I. Cook et al. and titled, "System and Method for Implementing Network Enhanced Gateway Functionality"; U.S. patent application Ser. No. 15/148,705 (the "'705 application"), filed on May 6, 2016 by Charles I. Cook et al. and titled, "System and Method for Implementing Extension of Customer LAN at Provider Network Service Point"; U.S. patent application Ser. No. 15/148,711 (the "'711 application"), filed May 6, 2016 by Charles I. Cook et al. and titled, "System and Method for Implementing Isolated Service Overlays between Provider Network Service Point and Customer Premises"; U.S. patent application Ser. No. 15/148,721 (the "'721 application"), filed on May 6, 2016 by Charles I. Cook et al. and titled, "System and Method for Implementing Network Experience Shifting"; and U.S. patent application Ser. No. 15/222,623 (the "'623 application"), filed Jul. 28, 2016 by Michael K. Bugenhagen et al. and titled, "System and Method for Implementing Customer Control Point or Customer Portal". Each of the '688, '705, '711, and '721 applications claim priority to each of U.S. Patent Application Ser. No. 62/157, 795 (the "'795 application"), filed May 6, 2015 by Charles I. Cook et al. and titled, "NFVI Enhanced Open Business/ Residential Gateways and Customer Portal", U.S. Patent Application Ser. No. 62/159,788 (the "'788 application"), filed May 11, 2015 by Charles I. Cook et al. and titled, "NFVI Enhanced Open Business/Residential Gateways and Customer Portal", U.S. Patent Application Ser. No. 62/172, 359 (the "'359 application"), filed Jun. 8, 2015 by Charles I. Cook et al. and titled, "Enhanced LAN With Customer Portal Control". The '721 application further claims priority to U.S. Patent Application Ser. No. 62/299,346 (the "'346 application"), filed Feb. 24, 2016 by Charles I. Cook et al. and titled, "Experience Shifting". The '623 application claims priority to the '346 application and to U.S. Patent Application Ser. No. 62/299,357 (the "'357 application"), filed Feb. 24, 2016 by Michael K. Bugenhagen et al. and titled, "Control Point or Customer Portal".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing Internet of Things functionality, and, in particular embodiments, to methods, systems, apparatus, and computer software for implementing Internet of Things ("IoT") self-organizing network functionality.

BACKGROUND

Although Internet of Things ("IoT") devices can currently be found in the market place, such conventional IoT devices do not appear to be capable of implementing self-organizing network functionality. Importantly, any IoT networks or IoT meshes comprising such conventional IoT devices do not appear to be capable of self-healing should one or more of the conventional IoT devices in these conventional IoT networks or meshes encounter failure, become disabled, or move outside the range of these networks.

Hence, there is a need for more robust and scalable solutions for implementing Internet of Things functionality, and, in particular embodiments, to methods, systems, apparatus, and computer software for implementing Internet of Things ("IoT") self-organizing network functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
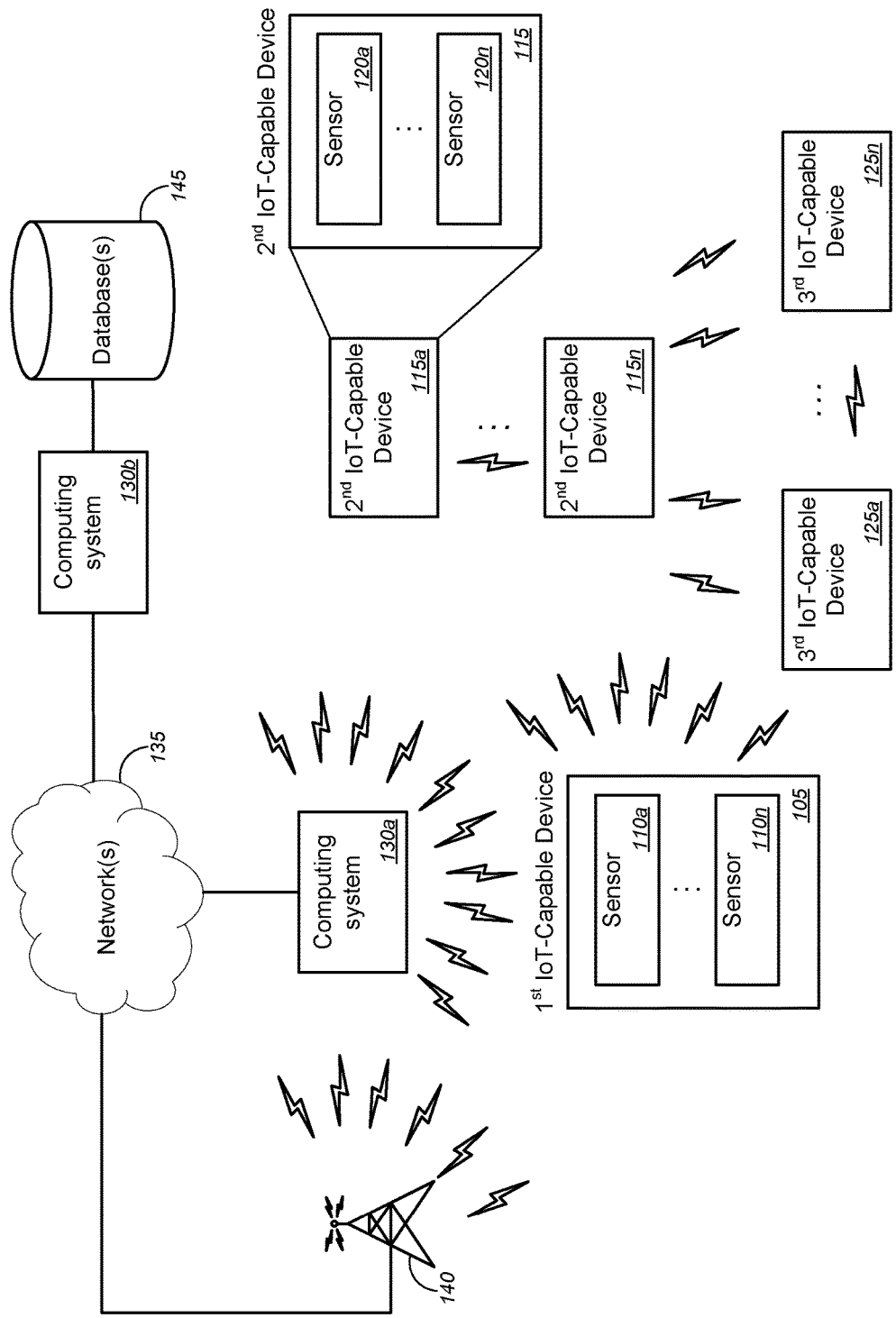
FIG. 1 is a schematic diagram illustrating a system for implementing Internet of Things ("IoT") self-organizing network functionality, in accordance with various embodiments.

Various embodiments provide tools and techniques for implementing Internet of Things functionality, and, in particular embodiments, to methods, systems, apparatus, and computer software for implementing Internet of Things ("IoT") self-organizing network functionality.

In various embodiments, a first IoT-capable device might receive beacon data from each of the one or more other IoT-capable devices in a self-organizing network ("SON") of IoT devices, might autonomously compare the received beacon data with stored beacon data, and might send at least one first data to a computing system to update the computing system of any changes in the SON (i.e., whether there are any new IoT-capable devices, any previously known IoT-capable devices that have now failed, any previously known IoT-capable devices have now been disabled, any previously known IoT-capable devices have now moved out of range, and/or the like). The computing system might receive the at least one first data, might analyze the at least one first data to determine a status of each IoT-capable device in the SON, might generate control instructions, and might autonomously send the control instructions to at least one of the IoT-capable devices in the SON to improve the functionality of the SON, by causing each of the at least one of the IoT-capable devices in the SON to change at least one of its device settings, its device configurations, its network configurations, its functions within the SON of IoT-capable devices, and/or the like.

Merely by way of example, in some cases, the IoT-capable devices in the SON might include, but are not limited to, at least one of one or more household appliances, one or more kitchen appliances, one or more user devices, one or more vehicles, one or more wireless access points, one or more sensor devices, a gateway device, one or more wireless access points ("WAPs"), or an IoT human interface device, and/or the like. In some instances, the one or more sensors might include, without limitation, at least one of a temperature sensor (e.g., heat sensors, infrared sensors, thermometers, ambient temperature sensors, skin temperature sensors, etc.), a particulate sensor, a light sensor (e.g., ambient light sensors, luminosity sensors, illuminance sensors, solar light sensors, etc.), an air quality sensor (e.g., CO sensors, toxic gas sensors, pollution sensors, etc.), a humidity sensor, a proximity sensor (e.g., for sensing proximity to user devices, to IoT-devices, to emergency response devices, to safe zone transponders, to other locations, etc.), a location sensor (e.g., global positioning system ("GPS") devices, global navigation satellite system ("GNSS") devices, relative position sensors, other location sensors, etc.), a location beacon (that broadcasts or otherwise transmits location information of the object within which the beacon is disposed), an object identifier beacon (that broadcasts or otherwise transmits object identification or identifier information to requesting devices or the like), a flame detector, an atmospheric oxygen level monitor, an atmospheric carbon dioxide level monitor, an atmospheric nitrogen level monitor, an atmospheric pressure sensor, a carbon monoxide sensor, a smoke detector, a toxicity monitor (e.g., skin toxicity monitors, gas toxicity monitors, liquid toxicity monitors, poison detectors, etc.), a carcinogen detector, a radiation sensor, a telecommunications signal sensor, an audio sensor, a sound amplitude sensor, a frequency sensor, an accelerometer, a moisture sensor, a motion sensor, a wind sensor, a weather sensor, a seismic sensor, one or more cameras, a biometrics sensor, a water leak detector, a contact sensor, and/or the like.

In some embodiments, simple artificial intelligence ("AI") or full AI integration may be utilized within the IoT-capable device to aid in interactions with humans, machine-to-machine interactions, and/or other functionalities. In some instances, a set of thresholds in sensor levels of the IoT-capable device and/or of one or more other IoT devices to which the IoT-capable device is communicatively coupled may be utilized to initiate action (including, but not limited to, alerts, interpretation triggers, specific network actions, specific software/hardware actions, etc.). According to some embodiments, each IoT device in the SON might be assigned a unique identifier that enables secure and non-confused communications with particular IoT-capable devices or sensors (as no two devices or sensors will have the same identifier). In some cases, the unique identifier is at least one of Internet Protocol ("IP")-based, location based, or media access control identification ("MAC ID")-based, and/or the like. In some instances, the unique identifier might include an IPv6 identifier or the like. In some cases, the IPv6 identifiers may be used together with other identifiers for the same device. In some instances, such identification capability can simplify device registration and/or can be used to facilitate machine-to-machine communications, machine-to-network communications, and/or the like. In some cases, energy harvesting may be utilized to power IoT devices (including the IoT-capable devices), either in populated areas or in remote areas. In some embodiments, the IoT-capable device (and/or other IoT devices communicatively coupled thereto) may be configured and/or designed to be agnostic to hardware or network of devices with which it is in communication.

According to some embodiments, the beacon data may autonomously be communicated between two or more IoT devices via one or more application programming interfaces ("APIs") established between the two or more IoT devices. Alternatively, or additionally, the beacon data may autonomously be communicated between two or more IoT devices via one or more virtual private network ("VPN") connections established between the two or more IoT devices. In some embodiments, quantum security methods may be utilized to protect data and user privacy.

In general, an IoT device with SON capabilities may have the ability to sense other IoT devices in close proximity to it. In some instances, IoT devices may have a beacon to identify themselves. Neighboring IoT devices can receive the beacon data from the beacon, and maintain a table of neighboring devices it can receive. Periodically, the IoT device scans for the existence of neighboring IoT devices and compares it to its table of neighbors. If there is a new neighbor, that information is reported to a SON server. Likewise, if a neighbor is missing, disabled, or failing, that information is also reported.

In addition to the presence or absence of a neighboring IoT device, the signal strength of the neighbor can also be provided to the SON server. The beacons of the IoT devices can be set to a specific (predetermined) power level. The power level can be included in the beacon. Additionally, or alternatively, geographic location information can be included in the beacon as well as the unique identifier of the device. All this information is collected from the neighboring device beacon and forwarded to the SON server. The SON server then uses the information to generate alarms to indicate that a particular IoT device has failed, been disabled, or moved, etc., and to potentially initiate a dispatch or advertisement in order to fill a hole in a network resulting from a failed, disabled, or moved IoT device. The SON server can also reconfigure a particular IoT device(s) to increase or decrease communication transmit power or modify other configuration parameters.

The SON server can be on a physical platform or a virtualized instance in the network. Additionally, a SON server can generate virtualized copies of the IoT devices that have been reported. It can then use these virtualized instances to run simulations to determine a priori the result of different configuration scenarios prior to invoking those scenarios (i.e., sending control instructions to the IoT devices to implement those scenarios, etc.).

In some cases, there may not be a centralized SON server. In such cases, the individual IoT devices themselves (acting as a collective or as a distributed computing system, or the like) use the received beacon data to increase or decrease their communication transmit power to fill in coverage holes or minimize interference. In some cases, where the IoT device has multiple capabilities or configurations, these may be modified in order to improve the overall network. According to some embodiments, these devices can also be configured to try and establish at least two communications paths with other IoT devices in order to generate redundant paths. If only one path can be established, that gets reported to its neighbor who forwards that information to an alarm point where the notification of a gap in the communications network of the IoT devices can be reported and addressed.

At least some of these and other functions of the system 100 (and its components) are described in greater detail below with respect to FIGS. 2-6.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, virtualized network function technology, Internet of Things ("IoT") technology, machine-to-machine communication, self-organizing network ("SON") technology, and/or the like. In other aspects, certain embodiments, can improve the functioning of user equipment or systems themselves (e.g., IoT device networks, IoT devices, IoT systems, human interface devices, SON of IoT devices, etc.), for example, by analyzing data from one or more IoT devices in the SON of IoT devices regarding other IoT devices in the SON, to determine the status of the IoT devices in the SON, and, based on the determined status of the IoT devices, autonomously generating and sending (to at least one of the IoT devices in the SON) control instructions for causing the at least one of the IoT devices to change at least one of its device settings, its device configurations, its network configurations, or its functions within the SON of IoT-capable devices, and/or the like. In particular, to the extent any abstract concepts are present in the various embodiments, those concepts can be implemented as described herein by devices, software, systems, and methods that involve specific novel functionality (e.g., steps or operations), such as analyzing data from one or more IoT devices in the SON of IoT devices regarding other IoT devices in the SON, to determine the status of the IoT devices in the SON, and, based on the determined status of the IoT devices, autonomously generating and sending (to at least one of the IoT devices in the SON) control instructions for causing the at least one of the IoT devices to change at least one of its device settings, its device configurations, its network configurations, or its functions within the SON of IoT-capable devices, and/or the like, which improves the interaction between the various IoT devices within SON, improves the functionality of the SON of IoT devices, and/or the like, to name a few examples, that extend beyond mere conventional computer processing operations. These functionalities can produce tangible results outside of the implementing computer system, including, merely by way of example, improved functionality of the SON of IoT devices, and/or the like, at least some of which may be observed or measured by customers and/or service providers.

In an aspect, a method might be provided for implementing Internet of Things ("IoT") self-organizing network functionality. The method might comprise receiving, with a computing system, at least one first data from at least one first IoT-capable device of a plurality of IoT-capable devices, the at least one first data comprising data regarding one or more second IoT-capable devices of the plurality of IoT-capable devices of a self-organizing network ("SON") of IoT-capable devices. The method might also comprise analyzing, with the computing system, the at least one first data to determine a status of at least one second IoT-capable device of the one or more second IoT-capable devices and, based at least in part on the determined status of the at least one second IoT-capable device, generating, with the computing system, one or more control instructions. The method might further comprise autonomously sending, with the computing system, the one or more control instructions to one or more third IoT-capable devices of the plurality of IoT-capable devices, based at least in part on the determined status of the at least one second IoT-capable device, the one or more control instructions causing each of the one or more third IoT-capable devices to change at least one of its device settings, its device configurations, its network configurations, or its functions within the SON of IoT-capable devices, and/or the like.

In some embodiments, the computing system might be at least one of a SON server, a service provider server, a gateway device, a computing node, a cloud computing system, a remote distributed computing system, or a distributed computing system that integrates computing resources from two or more IoT-capable devices of the plurality of IoT-capable devices, and/or the like. In some cases, the SON server might be one of a physical platform in a network or a virtualized instance in the network, or the like. In some instances, the plurality of IoT-capable devices might comprise at least one of one or more household appliances, one or more kitchen appliances, one or more user devices, one or more vehicles, one or more wireless access points, one or more sensor devices, a gateway device, one or more wireless access points ("WAPs"), or an IoT human interface device, and/or the like.

According to some embodiments, the method might further comprise receiving, with the computing system, at least one second data from one or more of the at least one first IoT-capable device or the one or more third IoT-capable devices, the at least one second data comprising data regarding the one or more third IoT-capable devices and analyzing, with the computing system, the at least one second data to determine a status of at least one third IoT-capable device of the one or more third IoT-capable devices. In such cases, generating the one or more control instructions and autonomously sending the one or more control instructions might comprise generating, with the computing system, one or more control instructions, based at least in part on the determined status of each of the at least one second IoT-capable device and the at least one third IoT-capable device, and autonomously sending, with the computing system, the one or more control instructions to the at least one third IoT-capable device, based at least in part on the determined status of each of the at least one second IoT-capable device and the at least one third IoT-capable device.

In some instances, the one or more third IoT-capable devices might comprise the at least one first IoT-capable device, and the method might further comprise receiving, with the computing system, at least one third data from one or more of the at least one first IoT-capable device or the one or more third IoT-capable devices, the at least one third data comprising data regarding the at least one first IoT-capable device and analyzing, with the computing system, the at least one third data to determine a status of the at least one first IoT-capable device. In such instances, generating the one or more control instructions and autonomously sending the one or more control instructions might comprise generating, with the computing system, one or more control instructions, based at least in part on the determined status of each of the at least one first IoT-capable device, the at least one second IoT-capable device, and the at least one third IoT-capable device, and autonomously sending, with the computing system, the one or more control instructions to one or more of the at least one first IoT-capable device or the at least one third IoT-capable device, based at least in part on the determined status of each of the at least one first IoT-capable device, the at least one second IoT-capable device, and the at least one third IoT-capable device.

Merely by way of example, in some embodiments, the method might further comprise generating, with the computing system, virtualized instances of the plurality of IoT-capable devices, based at least in part on one or more of the at least one first data, the at least one second data, or the at least one third data; autonomously running simulations, with the computing system, of different configurations of the plurality of IoT-capable devices using the generated virtualized instances of the plurality of IoT-capable devices, based at least in part on the determined status of one or more of the at least one first IoT-capable device, the at least one second IoT-capable device, or the at least one third IoT-capable device; and determining, with the computing system, which one or more configurations of the different configurations result in optimal network functions of the SON of IoT-capable devices, based at least in part on the simulation of different configurations of the plurality of IoT-capable devices. In such embodiments, the one or more control instructions might cause each of the one or more of the at least one first IoT-capable device or the at least one third IoT-capable device to change at least one of its device settings, its device configurations, its network configurations, or its functions within the SON of IoT-capable devices, and/or the like, to implement the one or more configurations of the different configurations that are determined to result in optimal network functions of the SON of IoT-capable devices.

Alternatively, or additionally, the method might further comprise generating, with the computing system, virtualized instances of the plurality of IoT-capable devices, based at least in part on one or more of the at least one first data, the at least one second data, or the at least one third data; autonomously running simulations, with the computing system, of different configurations of the plurality of IoT-capable devices using the generated virtualized instances of the plurality of IoT-capable devices, based at least in part on the determined status of one or more of the at least one first IoT-capable device, the at least one second IoT-capable device, or the at least one third IoT-capable device; autonomously identifying, with the computing system, one or more network paths between each IoT-capable device and another IoT-capable device of the plurality of IoT-capable devices that result in optimal network functions of the SON of IoT-capable devices, based at least in part on the simulation of different configurations of the plurality of IoT-capable devices; and based on a determination that only one network path can be established between one particular IoT-capable device and at least one other particular IoT-capable device, autonomously sending, with the computing system, a notification to an alarm point, the notification indicating a gap in the SON of IoT-capable devices that should be addressed.

According to some embodiments, the determined status of the at least one second IoT-capable device might comprise one of new device, device failure, disabled device, or out-of-range device, and/or the like. In some embodiments, the at least one first IoT-capable device might receive beacon data from each of at least one second IoT-capable device of the one or more second IoT-capable devices, and the data regarding the one or more second IoT-capable devices might comprise the beacon data from each of the at least one second IoT-capable device. The beacon data from each of the at least one second IoT-capable device, in some cases, might comprise at least one of a unique identifier assigned to a particular one of the at least one second IoT-capable device, signal strength of the beacon data, geographic location information of the particular one of the at least one second IoT-capable device, relative location information of the particular one of the at least one second IoT-capable device with respect to other IoT-capable devices, communication transmit power level, or configuration parameters, and/or the like.

In another aspect, a system might be provided for implementing Internet of Things ("IoT") self-organizing network functionality. The system might comprise a plurality of IoT-capable devices comprising at least one first IoT-capable device, one or more second IoT-capable devices, and one or more third IoT-capable devices. The system might further comprise a computing system. Each of the at least one first IoT-capable device might comprise at least one first processor, at least one first transceiver, and a first non-transitory computer readable medium communicatively coupled to the at least one first processor. The first non-transitory computer readable medium might have stored thereon computer software comprising a first set of instructions that, when executed by the at least one first processor, causes the first IoT-capable device to: receive at least one first data regarding the one or more second IoT-capable devices; and send the at least one first data to the computing system via the at least one first transceiver.

The computing system might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the computing system to: receive the at least one first data from the at least one first IoT-capable device; analyze the at least one first data to determine a status of at least one second IoT-capable device of the one or more second IoT-capable devices; based at least in part on the determined status of the at least one second IoT-capable device, generate one or more control instructions; and autonomously send the one or more control instructions to the one or more third IoT-capable devices of the plurality of IoT-capable devices, based at least in part on the determined status of the at least one second IoT-capable device.

Each of the one or more third IoT-capable devices might comprise at least one third processor, at least one third transceiver, and a third non-transitory computer readable medium communicatively coupled to the at least one third processor. The third non-transitory computer readable medium might have stored thereon computer software comprising a third set of instructions that, when executed by the at least one third processor, causes the third IoT-capable device to: receive the one or more control instructions; and change at least one of its device settings, its device configurations, its network configurations, or its functions within the SON of IoT-capable devices, and/or the like, based at least in part on the one or more control instructions.

In some embodiments, the computing system might be at least one of a SON server, a service provider server, a gateway device, a computing node, a cloud computing system, a remote distributed computing system, or a distributed computing system that integrates computing resources from two or more IoT-capable devices of the plurality of IoT-capable devices, and/or the like. In some instances, the SON server might be one of a physical platform in a network or a virtualized instance in the network, and/or the like.

According to some embodiments, the plurality of IoT-capable devices might comprise at least one of one or more household appliances, one or more kitchen appliances, one or more user devices, one or more vehicles, one or more wireless access points, one or more sensor devices, a gateway device, or an IoT human interface device, and/or the like. In some cases, the one or more sensor devices might comprise at least one of one or more temperature sensors, one or more particulate sensors, one or more light sensors, one or more air quality sensors, one or more humidity sensors, one or more proximity sensors, one or more location sensors, one or more location beacons, one or more object identifier beacons, one or more flame detectors, one or more atmospheric oxygen level monitors, one or more atmospheric carbon dioxide level monitors, one or more atmospheric nitrogen level monitors, one or more atmospheric pressure sensors, one or more carbon monoxide sensors, one or more smoke detectors, one or more toxicity monitors, one or more carcinogen detectors, one or more radiation sensors, one or more telecommunications signal sensors, one or more audio sensors, one or more sound amplitude sensors, one or more frequency sensors, one or more accelerometers, one or more moisture sensors, one or more motion sensors, one or more wind sensors, one or more weather sensors, one or more seismic sensors, one or more cameras, one or more biometrics sensors, one or more water leak detectors, or one or more contact sensors, and/or the like.

Merely by way of example, in some cases, the determined status of the at least one second IoT-capable device might comprise one of new device, device failure, disabled device, or out-of-range device, and/or the like. According to some embodiments, the at least one first IoT-capable device might receive beacon data from each of at least one second IoT-capable device of the one or more second IoT-capable devices, and the data regarding the one or more second IoT-capable devices might comprise the beacon data from each of the at least one second IoT-capable device. In some instances, the beacon data from each of the at least one second IoT-capable device might comprise at least one of a unique identifier assigned to a particular one of the at least one second IoT-capable device, signal strength of the beacon data, geographic location information of the particular one of the at least one second IoT-capable device, relative location information of the particular one of the at least one second IoT-capable device with respect to other IoT-capable devices, communication transmit power level, or configuration parameters, and/or the like.

In yet another aspect, a method might be provided for implementing Internet of Things ("IoT") self-organizing network functionality. The method might comprise receiving, with a first IoT-capable device of a plurality of IoT-capable devices, beacon data from each of one or more second IoT-capable devices of the plurality of IoT-capable devices and autonomously comparing, with the first IoT-capable device, the received beacon data from the one or more second IoT-capable devices with stored beacon data for one or more third IoT-capable devices of the plurality of IoT-capable devices, at least one of the one or more second IoT-capable devices and at least one of the one or more third IoT-capable devices being the same device. The method might further comprise, based on a determination that the received beacon data differs from the stored beacon data, autonomously sending, with the first IoT-capable device, at least one first data to a computing system, the at least one first data comprising data regarding at least one of the one or more second IoT-capable devices, the one or more third IoT-capable device, a change in status of at least one second IoT-capable device of the one or more second IoT-capable devices, or a change in status of at least one third IoT-capable device of the one or more third IoT-capable devices, and/or the like.

In some embodiments, the beacon data from each of the one or more second IoT-capable devices might comprise at least one of a unique identifier assigned to a particular one of the one or more second IoT-capable devices, signal strength of the beacon data, geographic location information of the particular one of the one or more second IoT-capable devices, relative location information of the particular one of the one or more second IoT-capable devices with respect to other IoT-capable devices, communication transmit power level, or configuration parameters, and/or the like. In some cases, the stored beacon data might comprise beacon data that is stored in one or more tables in a local storage device of the first IoT-capable device.

According to some embodiments, the change in status of the at least one second IoT-capable device and the change in status of at least one third IoT-capable device might each indicate a current status comprising one of new device, device failure, disabled device, or out-of-range device, and/or the like.

In still another aspect, an Internet of Things ("IoT") device of a plurality of IoT-capable devices might comprise at least one processor, one or more sensors, at least one transceiver, and a non-transitory computer readable medium communicatively coupled to the at least one processor. The non-transitory computer readable medium might have stored thereon computer software comprising a set of instructions that, when executed by the at least one processor, causes the IoT-capable device to: receive beacon data from each of one or more second IoT-capable devices of the plurality of IoT-capable devices; autonomously compare the received beacon data from the one or more second IoT-capable devices with stored beacon data for one or more third IoT-capable devices of the plurality of IoT-capable devices, at least one of the one or more second IoT-capable devices and at least one of the one or more third IoT-capable devices being the same device; and based on a determination that the received beacon data differs from the stored beacon data, autonomously send at least one first data to a computing system, the at least one first data comprising data regarding at least one of the one or more second IoT-capable devices, the one or more third IoT-capable device, a change in status of at least one second IoT-capable device of the one or more second IoT-capable devices, or a change in status of at least one third IoT-capable device of the one or more third IoT-capable devices, and/or the like.

According to some embodiments, the beacon data from each of the one or more second IoT-capable devices might comprise at least one of a unique identifier assigned to a particular one of the one or more second IoT-capable devices, signal strength of the beacon data, geographic location information of the particular one of the one or more second IoT-capable devices, relative location information of the particular one of the one or more second IoT-capable devices with respect to other IoT-capable devices, communication transmit power level, or configuration parameters, and/or the like. In some instances, the IoT-capable device might further comprise a local storage device, and the stored beacon data might comprise beacon data that is stored in one or more tables in the local storage device of the IoT-capable device.

In some embodiments, the change in status of the at least one second IoT-capable device and the change in status of at least one third IoT-capable device might each indicate a current status comprising one of new device, device failure, disabled device, or out-of-range device, and/or the like. In some cases, the plurality of IoT-capable devices might comprise at least one of one or more household appliances, one or more kitchen appliances, one or more user devices, one or more vehicles, one or more wireless access points, one or more sensor devices, a gateway device, or an IoT human interface device, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing Internet of Things functionality, and, in particular embodiments, to methods, systems, apparatus, and computer software for implementing Internet of Things ("IoT") self-organizing network functionality, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing Internet of Things ("IoT") self-organizing network functionality, in accordance with various embodiments. In the non-limiting embodiment of FIG. 1, system 100 might include, without limitation, a first IoT-capable device 105. In some embodiments, the first IoT-capable device 105 might comprise one or more sensors 110a-110n (collectively, "IoT-capable sensors 110," "IoT sensors 110," or "sensors 110"). Although not shown, the first IoT-capable device 105 might alternatively, or additionally, comprise one or more external IoT-capable sensors that feed sensor data (via wired or wireless connection) to the first IoT-capable device 105.

System 100 might, according to some embodiments, further comprise at least one of one or more second IoT-capable devices 115a-115n (collectively, "second IoT-capable devices 115," "IoT devices 115," or "devices 115"), one or more sensors 120a-120n disposed with each of at least one of the one or more second IoT-capable devices 115 (collectively, "IoT-capable sensors 120," "IoT sensors 120," or "sensors 120"), one or more third IoT-capable devices 125a-125n (collectively, "third IoT-capable devices 125" or "devices 125"), and/or the like. In some cases, the sensors 120 might be similar, if not identical, to the sensors 110. Here, the first IoT-capable device 105 might be similar, if not identical, to each of the second IoT-capable devices 115a-115n or each of the third IoT-capable devices 125a-125n, except that, for the purposes of illustration herein, the first IoT-capable device 105 refers to the device that is the focus of collecting data regarding nearby or adjacent IoT-capable devices (i.e., devices that are within communications range of the first IoT-capable devices 125, or the like) and sending at least one first data regarding such nearby or adjacent IoT-capable devices to a computing system 130, while the one or more second IoT-capable devices 115 refer to the one or more of a plurality of the devices either directly provide data to the first IoT-capable device 105 (or other devices) via beacons or the like or indirectly provide data to the first IoT-capable device 105 (or other devices) by not sending expected data (e.g., beacon data or the like) due to device failure, being disabled, or moving out of range of the first IoT-capable device, and/or the like. The one or more third IoT-capable devices 125 refer to devices whose device settings, device configurations, network configurations, functions within the self-organizing network ("SON") of IoT-capable devices, and/or the like may be changed by the computing system 130 in response to analysis of the at least one first data. In some cases, the one or more third IoT-capable devices 125 might comprise at least one second IoT-capable device 115 of the one or more second IoT-capable device 115. In some instances, the one or more third IoT-capable devices 125 might alternatively or additionally comprise the at least one first IoT-capable device 105. When one of the one or more second IoT-capable devices 115 (or one of the one or more third IoT-capable devices 125) becomes the focus of collecting data regarding nearby or adjacent IoT-capable devices (i.e., devices that are within communications range of the first IoT-capable devices 105, or the like) and sending at least one first data regarding such nearby or adjacent IoT-capable devices to a computing system 130, that particular second IoT-capable device 115 (or that particular third IoT-capable device 125) will be referred to as the first IoT-capable device 105.

In some embodiments, the IoT-capable devices 105, 110, and 125 (collectively, the "plurality of IoT-capable devices") might be located at a customer premises or might otherwise be associated with a user. The customer premises might, in some instances, include, without limitation, a residential premises, a business premises, a multi-dwelling premises, a unit within a multi-dwelling premises, industrial premises, commercial offices, government facility, public facility, and/or the like. In other embodiments, at least some, if not all, of the plurality of IoT-capable devices might be located or disposed outside of any of these customer premises, and in some cases, might even be mobile or portable IoT-capable devices.

Merely by way of example, in some aspects, each of the first, second, and/or third IoT-capable devices 105, 115, and/or 125 might include, without limitation, at least one of one or more household appliances, one or more kitchen appliances, one or more user devices, one or more vehicles, one or more wireless access points, one or more sensor devices, a gateway device, one or more wireless access points ("WAPs"), or an IoT human interface device (such as the IoT human interface device as described in detail in the '764 and '710 applications, which have already been incorporated herein by reference in their entirety), and/or the like. The one or more user devices, in some instances, might include, but are not limited to, at least one of a tablet computer, a smart phone, a mobile phone, a personal digital assistant, a desktop computer, a television, a set-top box, a gaming console, a portable gaming device, a human interface device (such as the IoT human interface device as described in detail in the '764 and '710 applications), and/or the like that are in wireless communication with the first IoT-capable devices 105, with at least one of the one or more second IoT-capable devices 115, with at least one of the one or more third IoT-capable devices 125, with the computing system 130, and/or the like.

The one or more sensors 110 or 120 might include, without limitation, at least one of a temperature sensor (e.g., heat sensors, infrared sensors, thermometers, ambient temperature sensors, skin temperature sensors, etc.), a particulate sensor, a light sensor (e.g., ambient light sensors, luminosity sensors, illuminance sensors, solar light sensors, etc.), an air quality sensor (e.g., CO sensors, toxic gas sensors, pollution sensors, etc.), a humidity sensor, a proximity sensor (e.g., for sensing proximity to user devices, to IoT-devices, to emergency response devices, to safe zone transponders, to other locations, etc.), a location sensor (e.g., global positioning system ("GPS") devices, global navigation satellite system ("GNSS") devices, relative position sensors, other location sensors, etc.), a location beacon (that broadcasts or otherwise transmits location information of the object within which the beacon is disposed), an object identifier beacon (that broadcasts or otherwise transmits object identification or identifier information to requesting devices or the like), a flame detector, an atmospheric oxygen level monitor, an atmospheric carbon dioxide level monitor, an atmospheric nitrogen level monitor, an atmospheric pressure sensor, a carbon monoxide sensor, a smoke detector, a toxicity monitor (e.g., skin toxicity monitors, gas toxicity monitors, liquid toxicity monitors, poison detectors, etc.), a carcinogen detector, a radiation sensor, a telecommunications signal sensor, an audio sensor, a sound amplitude sensor, a frequency sensor, an accelerometer, a moisture sensor, a motion sensor, a wind sensor, a weather sensor, a seismic sensor, one or more cameras, a biometrics sensor, a water leak detector, a contact sensor, and/or the like.

In some embodiments, the system 100 might comprise a computing system 130a, which might be located at the customer premises 110 or might, in some cases, serve as a demarcation point between the customer local area network at the customer premises and the service provider network (e.g., network(s) 135 or the like). In some cases, the computing system 130a might simply be within local (wired or wireless) communications range of the first IoT-capable device 105 (and/or of any of the plurality of IoT-capable devices). The computing system 130a might communicatively couple (via wired or wireless connection) with the first IoT-capable device 105 (and perhaps also with each of at least one of the one or more second IoT-capable devices 115 and/or with each of at least one of the one or more third IoT-capable devices 125). Alternatively, or additionally, system 100 might comprise a remote computing system 130b that is associated with a service provider and that provides similar (if not identical) functionality as the computing system 130a. The remote computing system 130b might communicatively couple (via wired or wireless connection) with the first IoT-capable device 105 (and perhaps also with each of at least one of the one or more second IoT-capable devices 115 and/or with each of at least one of the one or more third IoT-capable devices 125), via network(s) 135, in some cases, via one or more telecommunications relay systems 140 and/or via computing system 130a. In some cases, the remote computing system 130b might communicatively couple with one or more databases 145 that store at least one of information regarding the first IoT-capable device 105; information regarding at least one of the one or more sensors 110; information regarding at least one of the one or more second IoT-capable devices 115; information regarding at least one of the one or more sensors 120; information regarding at least one of the one or more third IoT-capable devices 125; information regarding communications amongst these devices and sensors; information regarding data exchanged between the user and each of the devices 105, 115, and/or 125; information regarding the network; information regarding communications between the computing system 130a or 130b and each of the first IoT-capable device 105, the second IoT-capable devices 115, and the third IoT-capable devices 125; and/or the like. Any sensitive information, such as health-related information, sensor data related to physiological conditions of the user, personal information about the user, or other sensitive data might be encrypted prior to any communications with other devices, and in some cases may be encrypted prior to storing on the local data stores of the devices, and/or may not be sent at all. In some embodiments, quantum security methods may be utilized to protect data and user privacy.

According to some embodiments, the network(s) 135 might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks. In a particular embodiment, the network 135 might include an access network of the service provider (e.g., an Internet service provider ("ISP")), or the like. The one or more telecommunications relay systems 140 might include, without limitation, one or more wireless network interfaces (e.g., wireless modems, wireless access points, and the like), one or more towers, one or more satellites, and/or the like. According to some embodiments, one or more of the first IoT-capable devices 105, at least one of the one or more second IoT-capable devices 115, and/or at least one of the one or more third IoT-capable devices 125 might each comprise a software-defined multiple radio device or other multiple radio device (e.g., multiple radio devices that comprise multiple physical layer chipsets or the like) that allows each of these devices to simultaneously operate in several standards and frequencies, including, but not limited to, Wi-Fi, LTE, IoT standards (like 6LowPAN, LoRa, etc.). In this manner, these devices might each serve as an access point, small cell, and IoT base, simultaneously, with the same RF transmit stage. The multiple radio device functionality and implementation are described in detail in the '7086 and '878 applications, which have already been incorporated herein by reference in their entirety.

The machine-to-machine communications between the first IoT-capable device 105 and each of the one or more second IoT-capable devices 115a-115n, between the first IoT-capable device 105 and each of the one or more third IoT-capable devices 125a-125n, and between the first IoT-capable device 105 and the computing system 130a are represented in FIG. 1 by the lightning bolt symbols, which in some cases denotes wireless communications (although, in some instances, need not be wireless, but can be wired communications). In some instances, each IoT-capable device of the plurality of IoT-capable devices 105, 115a-115n, and 125a-125n, each IoT-capable sensor of the plurality of IoT-capable sensors 110a-110n, each IoT-capable sensor of the plurality of IoT-capable sensors 120a-120n, and/or the like might be assigned a unique identifier that enables secure and non-confused communications with particular IoT-capable devices or sensors (as no two devices or sensors will have the same identifier). In some cases, the unique identifier is at least one of Internet Protocol ("IP")-based, location based, or media access control identification ("MAC ID")-based, and/or the like. In some instances, the unique identifier might include an IPv6 identifier or the like. In some cases, the IPv6 identifiers may be used together with other identifiers for the same device. In some instances, such identification capability can simplify device registration and/or can be used to facilitate machine-to-machine communications, machine-to-network communications, and/or the like.

According to some embodiments, one or more application programming interfaces ("APIs") might be established between the first IoT-capable device 105 and each of the IoT-capable sensors 110a-110n, between the first IoT-capable device 105 and each of the one or more second IoT-capable devices 115a-115n, between the first IoT-capable device 105 and each of the IoT-capable sensors 120a-120n, between the first IoT-capable device 105 and each of the one or more third IoT-capable devices 125a-125n, between the first IoT-capable device 105 and each of the computing systems 130a or 130b, and/or the like. The APIs facilitate communications with these IoT-capable devices, which could number in the thousands or more. In some embodiments, artificial intelligence ("AI") may be utilized in the IoT-capable devices to improve machine-to-machine interactions between the first IoT-capable device 105 and each of the IoT-capable sensors 110a-110n, between the first IoT-capable device 105 and each of the one or more second IoT-capable devices 115a-115n, between the first IoT-capable device 105 and each of the IoT-capable sensors 120a-120n, between the first IoT-capable device 105 and each of the one or more third IoT-capable devices 125a-125n, between the first IoT-capable device 105 and each of the computing systems 130a or 130b, and/or the like, and to improve utilization of the IoT-capable sensors 110 and/or 120, the plurality of IoT-capable devices 105, 115, and/or 125, and/or the like.

In some embodiments, at least one of the plurality of IoT-capable devices might include, without limitation, at least one of a voice interface device (including one or more speakers and one or more microphones; in some cases with voice and language recognition; perhaps assisted by any AI functionality that is present in the device or the like), a button interface, a gesture control interface, a location beacon (that sends location information to other devices, in some cases, in a broadcast, in a unicast, or in a directed transmission manner, or the like), a touchscreen user interface, a display interface, a haptic feedback interface, a wireless communications interface (that can communicate with one or more user devices associated with the user), and/or the like. In other words, through one or more of voice interactions, physical interactions, gesture interactions, and/or user device interactions, or the like, the user can communicate with and interact with at least one of the IoT-capable devices 105, 115, and/or 125 to provide information to the IoT-capable devices 105, 115, and/or 125, to provide information to the computing systems 130a and/or 130b, to provide commands to at least one of the IoT-capable devices 105, 115, and/or 125, to receive sensor data or analyses of sensor data, to receive alerts, to receive feedback or suggestions, and/or the like.

In operation, the first IoT-capable device 105 might receive beacon data from each of the one or more second IoT-capable devices 115a-115n, might autonomously compare the received beacon data with stored beacon data, and might determine whether the received beacon data differs from the stored beacon data (which might indicate whether a new IoT-capable device is detected, whether a previously known IoT-capable device has failed, whether a previously known IoT-capable device has been disabled, whether a previously known IoT-capable device has moved out of range, etc.). Based on a determination that the received beacon data differs from the stored beacon data, the first IoT-capable device 105 might autonomously send at least one first data to a computing system 130a and/or 130b, or the like. The at least one first data might comprise data regarding the one or more second IoT-capable devices 115a-115n and/or regarding any new IoT-capable devices, any previously known IoT-capable devices that have now failed, any previously known IoT-capable devices have now been disabled, any previously known IoT-capable devices have now moved out of range, and/or the like. In some embodiments, the use of time stamps or other identifying mechanisms, duplicate data may be identified and may be prevented from being forwarded to other devices, in order to achieve or maintain network efficiency and minimize the potential for network congestion or the like. This set of embodiments is described in detail below with respect to FIGS. 3A and 3B.

The computing system 130a and/or 130b might receive the at least one first data, and might analyze the at least one first data to determine a status of at least one second IoT-capable device 115 of the one or more second IoT-capable devices 115a-115n. In some cases, the computing system 130a and/or 130b might also receive at least one second data from one or more of the at least one first IoT-capable device 105 and/or the one or more third IoT-capable devices 125a-125n, and might analyze the at least one second data to determine a status of at least one third IoT-capable device 125 of the one or more third IoT-capable devices 125a-125n, the at least one second data comprising data regarding the one or more third IoT-capable devices 125a-125n. Alternatively, or additionally, the computing system 130a and/or 130b might receive at least one third data from one or more of the at least one first IoT-capable device 105 and/or the one or more third IoT-capable devices 125a-125n, and might analyze the at least one third data to determine a status of the at least one first IoT-capable device 105, the at least one third data comprising data regarding the one or more first IoT-capable device 105.

The computing system 130a and/or 130b might subsequently generate one or more control instructions, based at least in part on the determined status of each of one or more of the at least one first IoT-capable device 105 (if applicable), the at least one second IoT-capable device 115, and/or the at least one third IoT-capable device 125 (if applicable), and might autonomously send the one or more control instructions to one or more of the at least one first IoT-capable device 105 or the at least one third IoT-capable device 125, based at least in part on the determined status of each of one or more of the at least one first IoT-capable device 105 (if applicable), the at least one second IoT-capable device 115, and/or the at least one third IoT-capable device 125 (if applicable).

In some embodiments, the computing system 130a and/or 130b might generate virtualized instances of the plurality of IoT-capable devices, based at least in part on one or more of the at least one first data, the at least one second data (if applicable), and/or the at least one third data (if applicable), and might autonomously run simulations of different configurations of the plurality of IoT-capable devices using the generated virtualized instances of the plurality of IoT-capable devices, based at least in part on the determined status of each of one or more of the at least one first IoT-capable device 105 (if applicable), the at least one second IoT-capable device 115, and/or the at least one third IoT-capable device 125 (if applicable). The computing system 130a and/or 130b might determine which one or more configurations of the different configurations result in optimal network functions of the SON of the IoT-capable devices, based at least in part on the simulation of different configurations of the plurality of IoT-capable devices. The computing system 130a and/or 130b might subsequently generate one or more control instructions, based at least in part on the one or more configurations that are determined to result in optimal network functions of the SON of the IoT-capable devices, and might autonomously send the one or more control instructions to one or more of the at least one first IoT-capable device 105, the at least one second IoT-capable device 115, and/or the at least one third IoT-capable device 125 to implement the one or more configurations that are determined to result in optimal network functions of the SON of the IoT-capable devices. This set of embodiments is described in detail below with respect to FIGS. 3A, 3B, and 6B.

Merely by way of example, according to some embodiments, the computing system 130a and/or 130b might generate virtualized instances of the plurality of IoT-capable devices, based at least in part on one or more of the at least one first data, the at least one second data (if applicable), and/or the at least one third data (if applicable), and might autonomously run simulations of different configurations of the plurality of IoT-capable devices using the generated virtualized instances of the plurality of IoT-capable devices, based at least in part on the determined status of each of one or more of the at least one first IoT-capable device 105 (if applicable), the at least one second IoT-capable device 115, and/or the at least one third IoT-capable device 125 (if applicable). The computing system 130a and/or 130b might autonomously identify one or more network paths between each IoT-capable device and another IoT-capable device that result in optimal network functions of the SON of the IoT-capable devices, based at least in part on the simulation of different configurations of the plurality of IoT-capable devices. The computing system 130a and/or 130b might subsequently determine whether only one network path can be established between one particular IoT-capable device and at least one other particular IoT-capable device. If so, the computing system 130a and/or 130b might autonomously send a notification indicating a gap in the SON of the IoT-capable devices that should be addressed. In some embodiments, the computing system 130a and/or 130b might also generate one or more control instructions, in response to determining that only one network path can be established between the one particular IoT-capable device and the at least one other particular IoT-capable device, and might autonomously send the one or more control instructions to one or more of the at least one first IoT-capable device 105, the at least one second IoT-capable device 115, and/or the at least one third IoT-capable device 125 to implement one or more additional or redundant paths between the one particular IoT-capable device and the at least one other particular IoT-capable device. This set of embodiments is described in detail below with respect to FIGS. 4 and 6C.

Merely by way of example, in some embodiments, an IoT device with SON capabilities (e.g., one of the plurality of IoT-capable devices described above) may have the ability to sense other IoT devices in close proximity to it. In some instances, IoT devices may have a beacon to identify themselves. Neighboring IoT devices can receive the beacon data from the beacon, and maintain a table of neighboring devices it can receive. Periodically, the IoT device scans for the existence of neighboring IoT devices and compares it to its table of neighbors. If there is a new neighbor, that information is reported to a SON server. Likewise, if a neighbor is missing, disabled, or failing, that information is also reported to the SON server.

In addition to the presence or absence of a neighboring IoT device, the signal strength of the neighbor can also be provided to the SON server. The beacons of the IoT devices can be set to a specific (predetermined) power level. The power level can be included in the beacon. Additionally, or alternatively, geographic location information can be included in the beacon as well as the unique identifier of the device. All this information is collected from the neighboring device beacon and forwarded to the SON server. The SON server then uses the information to generate alarms to indicate that a particular IoT device has failed, been disabled, or moved, etc., and to potentially initiate a dispatch or advertisement in order to fill a hole in a network resulting from a failed, disabled, or moved IoT device. The SON server can also reconfigure a particular IoT device(s) to increase or decrease communication transmit power or modify other configuration parameters.

The SON server can be on a physical platform or a virtualized instance in the network. Additionally, a SON server can generate virtualized copies of the IoT devices that have been reported. It can then use these virtualized instances to run simulations to determine a priori the result of different configuration scenarios prior to invoking those scenarios (i.e., sending control instructions to the IoT devices to implement those scenarios, etc.).

In some cases, there may not be a centralized SON server. In such cases, the individual IoT devices themselves (acting as a collective or as a distributed computing system, or the like) use the received beacon data to increase or decrease their communication transmit power to fill in coverage holes or minimize interference. In some cases, where the IoT device has multiple capabilities or configurations, these may be modified in order to improve the overall network. According to some embodiments, these devices can also be configured to try and establish at least two communications paths with other IoT devices in order to generate redundant paths. If only one path can be established, that gets reported to its neighbor who forwards that information to an alarm point where the notification of a gap in the communications network of the IoT devices can be reported and addressed.

For centralized computing systems for management of the SON, the centralized processor or computing system may potentially generate some or all of the behavior control of the IoT devices within the IoT network of SON devices. Alternatively, for a distributed computing system whose processing functionalities are distributed across two or more (and in some cases, a substantial portion or the entire set) of IoT devices in the SON (i.e., a distributed computing system that only exists within the IoT devices themselves), each IoT device might have a profile that it uses to control its behavior in the presence of other similar IoT devices in the SON. Decisions on routing, transmit power, communications, and/ or the like may be handled local to the IoT device. The IoT device profile can be pre-programmed regarding where to report sensor data. It may also be preprogrammed where to go to check for periodic updates. The updates could modify the profile which would define behavior, etc. The IoT device may also indicate to its neighbors the existence of an update and depending on device resources may be able to source a copy of the update to neighboring devices. In some cases, information regarding the status of neighboring IoT devices might be stored locally on each IoT device, or, in some instances, may be stored in a distributed manner amongst the plurality of IoT devices in the SON (with the required redundancies in stored data in case some IoT devices fail, go off-line, or move out of range, etc.)

In some embodiments, control instructions (as well as other data or the like) may be received by particular IoT devices in the SON, and these particular IoT devices may be configured to forward the control instructions (as well as other data or the like) to other IoT devices in the SON that may not be able to communicate with the computing system. In some cases, updates and/or configuration information may be time stamped or otherwise identified so that a receiving device can determine whether or not it has already received the update, whether or not it has already executed the request, whether or not a previously received update or request supersedes or replaces the currently received update or request (e.g., if a later-time-stamped update or request is received before an earlier-time-stamped update or request, etc.).

According to some embodiments, depending on the intelligence of an IoT device that is receiving beacon information, the IoT device may retain a history of past information (e.g., status information regarding neighboring IoT devices, configuration data, updates, etc.) from which it may be able to derive predictive trends that may be used to provide advanced notification of when an event may occur. Alternatively, or additionally, the IoT device may be able correlate certain sensor data with other events. Predictive information can then be sent to the SON controller or to the distributed computing system that is made up of the IoT devices in the SON for further analysis or action, and the like.

Merely by way of example, in some aspects, data may be propagated from one part of the SON—in which the IoT devices therein may not have direct connectivity to a SON controller or remote computing system—through multiple intermediate IoT devices in order to communicatively couple to the SON controller or remote computing system. In some cases, such data propagation might be similar to the network paths as shown in, and described below with respect to, FIG. 4, or the like. In some instances, an IoT device might receive configuration information, updates, requests, command instructions, and/or the like from another IoT device, particularly if the IoT device does not have direct connectivity to a SON controller or remote computing system, or the like.

At least some of these and other functions of the system 100 (and its components) are described in greater detail below with respect to FIGS. 2-6.

Figure 2:
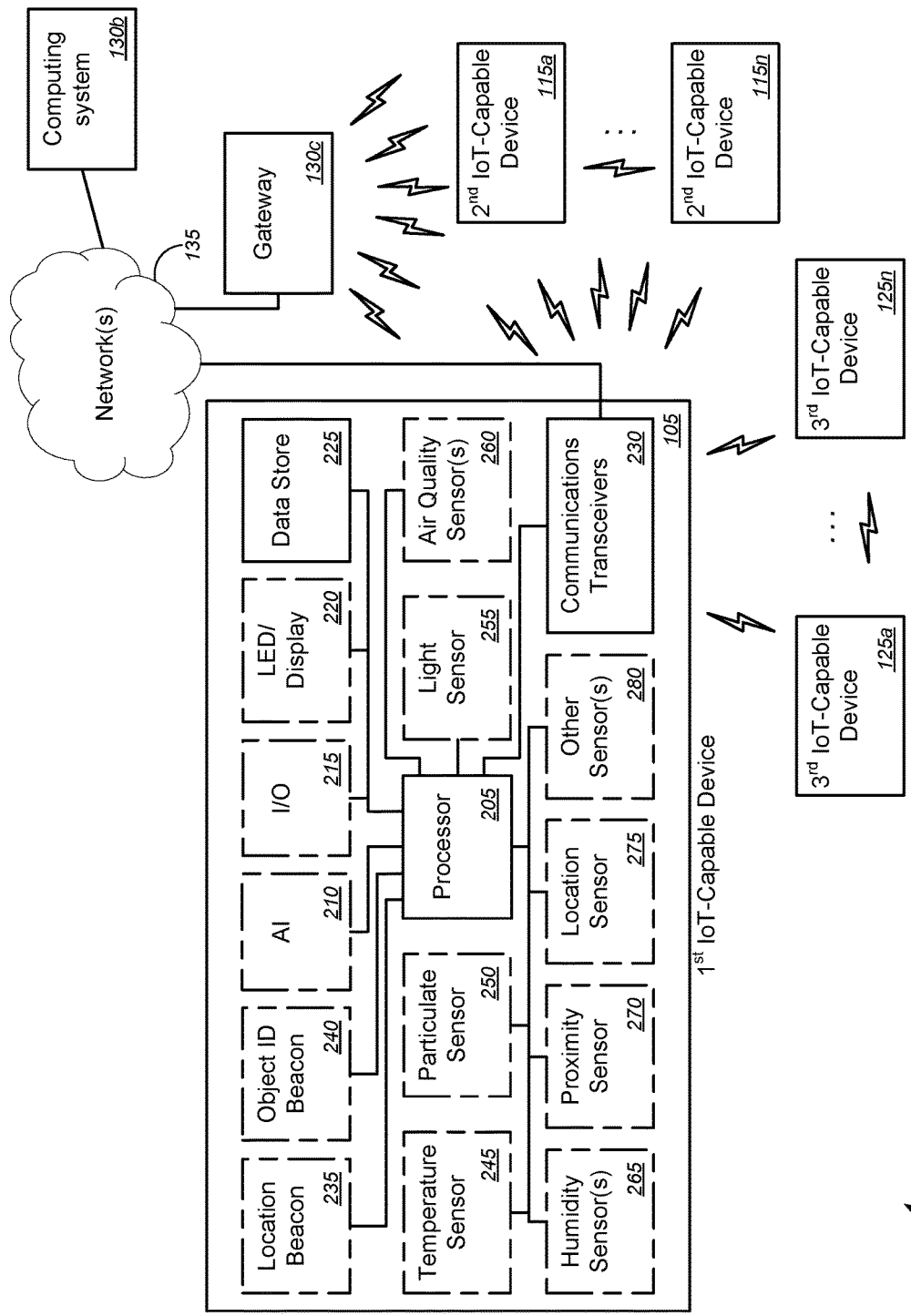
FIG. 2 is a schematic diagram illustrating another system for implementing IoT self-organizing network functionality, in accordance with various embodiments.

FIG. 2 is a schematic diagram illustrating another system 200 for implementing IoT self-organizing network functionality, in accordance with various embodiments. With reference to the non-limiting embodiment of FIG. 2, according to some embodiments, system 200 might comprise a first IoT-capable device 105 (which in this case might be one of a wearable device, a household device, an office device, a stationary device, or a portable device, and/or the like) that might include, without limitation, one or more processors 205 (which in some cases might include an artificial intelligence ("AI") system or module 210 (optional)), an input/ output ("I/O") device 215 (optional), one or more LED/ display devices 220 (optional), one or more data stores or computer readable storage media 225, one or more communications transceivers 230, a location beacon 235 (that broadcasts or otherwise transmits location information of the object within which the beacon is disposed) (optional), an object identifier beacon 240 (that broadcasts or otherwise transmits object identification or identifier information to requesting devices or the like) (optional), one or more temperature sensors 245 (e.g., heat sensors, infrared sensors, thermometers, ambient temperature sensors, skin temperature sensors, etc.) (optional), one or more particulate sensors 250 (optional), one or more light sensors 255 (e.g., ambient light sensors, luminosity sensors, illuminance sensors, solar light sensors, etc.) (optional), one or more air quality sensors 260 (e.g., CO sensors, toxic gas sensors, pollution sensors, etc.) (optional), one or more humidity sensors 265 (optional), one or more proximity sensors 270 (e.g., for sensing proximity to user devices, to IoT-devices, to emergency response devices, to safe zone transponders, to other locations, etc.) (optional), one or more location sensors 275 (e.g., global positioning system ("GPS") devices, global navigation satellite system ("GNSS") devices, relative position sensors, other location sensors, etc.) (optional), one or more other sensors 280 (optional), and/or the like. In some instances, the one or more other sensors 280 might include, but are not limited to, a flame detector, an atmospheric oxygen level monitor, an atmospheric carbon dioxide level monitor, an atmospheric nitrogen level monitor, one or more pressure sensors (e.g., atmospheric pressure sensors, water pressure sensors (when underwater), etc.), a carbon monoxide sensor, a smoke detector, one or more toxicity sensors (e.g., skin toxicity monitors, gas toxicity monitors, liquid toxicity monitors, poison detectors, etc.), a carcinogen detector, a radiation sensor, a telecommunications signal sensor, an audio sensor, a sound amplitude sensor, a frequency sensor, one or more accelerometers (e.g., for fitness tracking, fall detection, device motion detection, etc.), a moisture sensor, a motion sensor, a wind sensor, a weather sensor, a seismic sensor, one or more cameras, a biometrics sensor, a water leak detector, or a contact sensor, and/or the like.

The I/O device 215, in some cases, might include, without limitation, at least one of the following sets of components: a combination of one or more microphones, one or more speakers (which might be built-in speakers or external speakers connected through an audio jack or the like), one or more audio processors, and/or the like for voice interface functionality; one or more of at least one button, at least one touchscreen user interface, at least one display interface, and/or the like for touch interface functionality; one or more vibration, pressure, or force transducers and/or one or more pressure sensors that enable haptic feedback interface functionality; one or more wireless transceivers that communicate with one or more user devices associated with the user using any one or a combination of the wireless protocols described herein (including, but not limited to, 2.4 GHz or 5 GHz WiFi, Bluetooth, Z-wave, ZigBee, etc.) for wireless communication interface functionality; and/or the like. In some cases, the communications transceivers 230 might provide communications (either wired or wireless) between the first IoT-capable device 105 and the computing system 130b via network(s) 135, might provide machine-to-machine communications (either wired or wireless) between the first IoT-capable device 105 and each of the second IoT-capable devices 115a-115n, might provide machine-to-machine communications (either wired or wireless) between the first IoT-capable device 105 and each of the third IoT-capable devices 125a-125n, might provide machine-to-machine communications (either wired or wireless) between the first IoT-capable device 105 and each of the gateway 130c or the computing system 130b, and/or the like.

In some embodiments, the user might speak with the first IoT-capable device 105 to set particular modes, to provide information to the first IoT-capable device 105, to provide commands to the first IoT-capable device 105, to receive alerts as to the condition or state of the system and/or as to the environmental conditions around the user, to receive suggestions as to courses of action to take in response to sensor data, to receive notifications as to what devices the first IoT-capable device 105 is communicating with (or is about to communicate with) and as to what actions are being performed (or will be performed) as well as updates to the situation, and/or the like. Alternatively, or additionally, the user might interact with the first IoT-capable device 105 via one or more of at least one button, at least one touchscreen user interface, at least one display interface to perform one or more of these functions. In another alternative or additional embodiment, the user might interact with the first IoT-capable device 105 via haptic feedback interface, with one or more vibration, pressure, or force transducers providing haptic feedback to the user as a means of provide the user with the alerts, suggestions, notifications, and updates, while one or more pressure sensors might sense (and interpret) the user's response, commands, etc. In yet another alternative or additional embodiment, the user might interact with the first IoT-capable device 105 via one or more user devices (not shown) (including, but not limited to, a tablet computer, a smart phone, a mobile phone, a personal digital assistant, a desktop computer, a television, a set-top box, a gaming console, a portable gaming device, a human interface device (such as the IoT human interface device as described in detail in the '764 and '710 applications, which have already been incorporated herein by reference in their entirety), and/or the like) that are associated with the user and that are in wireless communication with the first IoT-capable device 105.

The first IoT-capable device 105, the IoT-capable sensors 235-280, the second IoT-capable devices 115a-115n, the third IoT-capable devices 125a-125n, the gateway 130c, the computing system 130b, and the network(s) 135 of system 200 in FIG. 2 are otherwise similar, if not identical, to the first IoT-capable device 105, the IoT-capable sensors 110a-110n or 120a-120n, the second IoT-capable devices 115a-115n, the third IoT-capable devices 125a-125n, the computing system 130a, the remote computing system 130b, and the network(s) 135, respectively, of system 100 in FIG. 1, and the descriptions of these components of system 100 are applicable to the corresponding components of system 200, respectively.

Figure 3A:
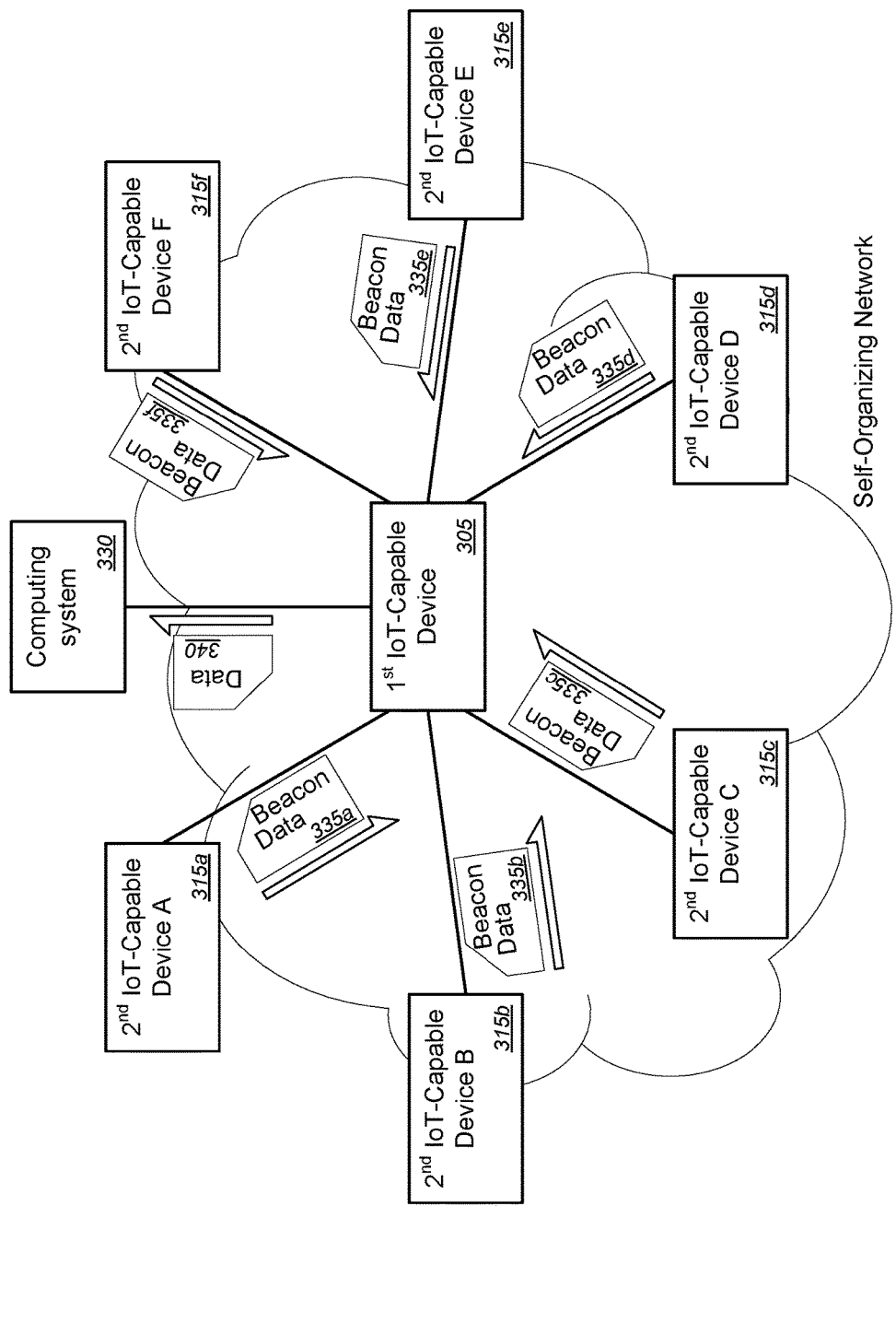
FIGS. 3A and 3B are schematic diagrams illustrating an exemplary embodiment in which IoT self-organizing network functionality is implemented to adjust to changes in the individual IoT-capable devices in the self-organizing network.
Figure 3B:
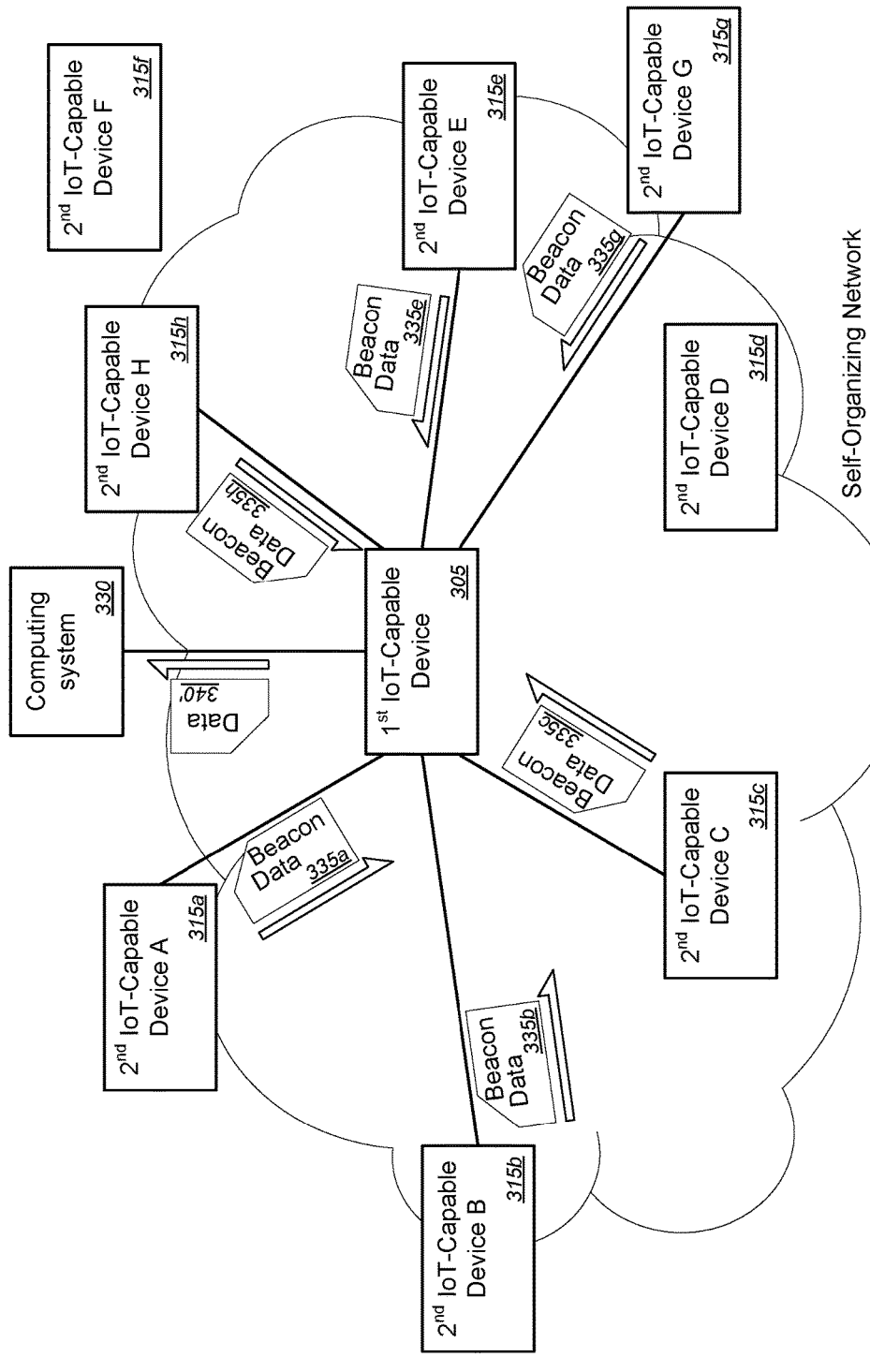

FIGS. 3A and 3B (collectively, "FIG. 3") are schematic diagrams illustrating an exemplary embodiment in which IoT self-organizing network functionality is implemented to adjust to changes in the individual IoT-capable devices in the self-organizing network ("SON") 300 or 300'. FIG. 3A depicts a SON 300 at a first time period, while FIG. 3B depicts a SON 300' at a second time period that is different from the first time period, the self-organizing networks 300 and 300' being substantially the same except that the self-organizing networks 300 and 300' differ by at least one node (i.e., IoT-capable device, IoT node, and/or the like). In other words, over time (i.e., from the first time period to the second period), the SON 300 becomes the SON 300' as at least one of the following events or incidents occur: one or more nodes in SON 300 experience device failure prior to the second time period; one or more nodes in SON 300 become disabled prior to the second time period; one or more nodes in SON 300 move beyond the range of at least one other node (if not all other nodes) in SON 300 prior to the second time period; one or more new nodes that were not present or connected to other nodes in SON 300 establish communications with (or at least send out beacon data autonomously to or send out beacon data in response to prompts/requests for beacon data from) at least one existing node in SON 300 prior to the second time period.

With reference to FIG. 3A, SON 300 might comprise a first IoT-capable device 305 (which might correspond to the first IoT-capable device 105 in FIGS. 1 and 2, or the like) and second IoT-capable devices A through F 315a-315f (collectively, "second IoT-capable devices 315," "IoT-capable devices 315," "devices 315," etc.; which might correspond to the one or more second IoT-capable devices 115a-115n in FIGS. 1 and 2, or the like), and/or the like. At the first time period, the second IoT-capable devices A through F 315a-315f each might send beacon data 335a-335f (collectively, "beacon data 335"), respectively, to the first IoT-capable device 305 or might generally broadcast the beacon data 335, which might be received by the first IoT-capable device 305. The beacon data 335, according to some embodiments, might include, without limitation, at least one of a unique identifier assigned to a particular one of the second IoT-capable devices A through F 315a-315f, signal strength or transmission power level of the beacon data, geographic location information of the particular one of the second IoT-capable devices A through F 315a-315f, relative location information of the particular one of the second IoT-capable devices A through F 315a-315f with respect to other IoT-capable devices, communication transmission power level, or configuration parameters, and/or the like. In some cases, the unique identifier assigned to a particular one of the second IoT-capable devices 315 might include, but is not limited to, at least one of Internet Protocol ("IP")-based (e.g., a unique IPv6 identifier, or the like), location based, or media access control identification ("MAC ID")-based, and/or the like.

In some embodiments, the first IoT-capable device 305 might autonomously compare the received beacon data 335 with stored beacon data (i.e., beacon data that is stored in a data store of the first IoT-capable device 305, such as data store 225 of FIG. 2, or the like), and might determine whether the received beacon data differs from the stored beacon data (which might indicate whether a new IoT-capable device is detected, whether a previously known IoT-capable device has failed, whether a previously known IoT-capable device has been disabled, whether a previously known IoT-capable device has moved out of range, and/or the like). Based on a determination that the received beacon data differs from the stored beacon data, the first IoT-capable device 305 might autonomously send at least one first data 340 to a computing system 330 (which might correspond to computing system 130a and/or 130b or gateway 130c of FIGS. 1 and 2), or might otherwise update the computing system 330 with information regarding the nodes in the SON 300 (e.g., based at least in part on the beacon data 335, the stored beacon data, and/or the like), or the like. The at least one first data 340 might comprise data regarding the second IoT-capable devices 315a-315f and/or regarding any new IoT-capable devices, any previously known IoT-capable devices that have now failed, any previously known IoT-capable devices have now been disabled, any previously known IoT-capable devices have now moved out of range, and/or the like. In some cases, the received beacon data 335a-335f might replace the stored beacon data. Alternatively, any received beacon data 335 might be time stamped and saved with previously received and time-stamped beacon data 335. The beacon data 335 might either be backed up at a database (e.g., database(s) 145 of FIG. 1, or the like), and/or the oldest set of beacon data 335 (i.e., at the earliest stored time period) might be deleted so that the latest set of beacon data 335 (i.e., at the current time period) can be saved in the local data store (in such cases, a predetermined number of sets of beacon data at their respective time periods as time stamped can be saved in the local data store, subject to change in number due to remaining storage space in the local data store and due to the number of second IoT-capable devices potentially increasing or decreasing at different time periods). As in FIG. 1, when one of the second IoT-capable devices 315 becomes the focus of collecting data regarding nearby or adjacent IoT-capable devices (i.e., devices that are within communications range of the first IoT-capable devices 305, or the like) and sending at least one first data regarding such nearby or adjacent IoT-capable devices to a computing system 330, that particular second IoT-capable device 315 will be referred to as the first IoT-capable device 305. For example, when the second IoT-capable device A 315a begins receiving beacon data from neighboring IoT-capable devices and sends data to computing system 330 (and perhaps also compares the received beacon data with stored beacon data, determines whether the received beacon data differs from the stored beacon data, and/or the like), the second IoT-capable device A 315a will become the first IoT-capable device 305 for purposes of description of the various embodiments.

Turning to FIG. 3B, SON 300', like SON 300, might comprise a first IoT-capable device 305 (which might correspond to the first IoT-capable device 105 in FIGS. 1 and 2, or the like) and second IoT-capable devices A through H 315a-315h (collectively, "second IoT-capable devices 315," "IoT-capable devices 315," "devices 315," etc.; which might correspond to the one or more second IoT-capable devices 115a-115n in FIGS. 1 and 2, or the like), and/or the like. At the second time period, the second IoT-capable devices A through C and E 315a-315c and 315e each might continue to send beacon data 335a-335c and 335e (collectively, "beacon data 335"), respectively, to the first IoT-capable device 305 or might generally broadcast the beacon data 335, which might be received by the first IoT-capable device 305. At this second time period, however, the second IoT-capable devices D and F 315d and 315f might cease to send or broadcast beacon data, either because the device 315 is experiencing device failure or has been disabled (such as the second IoT-capable device D 315d or the like) or because the device 315 has moved outside or beyond the range of the first IoT-capable device 305 (and/or beyond the range of any of the other connected devices 315a-315c, 315e, 315g, or 315h) (such as the second IoT-capable device F 315f or the like), and/or the like.

In some embodiments, the first IoT-capable device 305 might autonomously compare the received beacon data 335 (in this example, beacon data 335a-335c, 335e, 335g, and 335h) with stored beacon data (in this case, beacon data 335a-335f that is stored in a data store of the first IoT-capable device 305, such as data store 225 of FIG. 2, or the like), and might determine whether the received beacon data differs from the stored beacon data—in this instance, determining that the second IoT-capable device D 315d is either experiencing device failure or has been disabled, that the second IoT-capable device F 315f has moved beyond the range of the first IoT-capable device 305 and/or the SON 300', that the second IoT-capable devices 315g and 315h have each either been newly added, been repaired to correct device failures, been enabled or re-enabled (from a disabled state), or been moved to a location within range of the first IoT-capable device 305 and/or the SON 300', and/or the like. The first IoT-capable device 305 might subsequently autonomously send at least one first data 340' to the computing system 330, or might otherwise update the computing system 330 with information regarding the nodes in the SON 300' (e.g., based at least in part on the beacon data 335, the stored beacon data, and/or the like), or the like. The at least one first data 340' might comprise data regarding the second IoT-capable devices 315a-315c, 315e, 315g, and 315h and/or regarding any new IoT-capable devices (e.g., the second IoT-capable devices 315g and 315h), any previously known IoT-capable devices that have now failed (e.g., the second IoT-capable devices 315d or 315f), any previously known IoT-capable devices have now been disabled (e.g., the second IoT-capable devices 315d or 315f), any previously known IoT-capable devices have now moved out of range (e.g., the second IoT-capable device 315f), and/or the like. In some cases, the received beacon data 315a-315c, 315e, 315g, and 315h might replace the stored beacon data 335a-335f. Alternatively, any received beacon data 335 might be time stamped and saved with previously received and time-stamped beacon data 335. The beacon data 335 might either be backed up at a database (e.g., database(s) 145 of FIG. 1, or the like), and/or the oldest set of beacon data 335 (i.e., at the earliest stored time period) might be deleted so that the latest set of beacon data 335 (i.e., at the current time period) can be saved in the local data store (in such cases, a predetermined number of sets of beacon data at their respective time periods as time stamped can be saved in the local data store, subject to change in number due to remaining storage space in the local data store and due to the number of second IoT-capable devices potentially increasing or decreasing at different time periods).

In some embodiments, the computing system 330 or the SON 300' might connect with IoT devices that are far from an access node by using mid nodes or other IoT devices, or the like, thereby extending the range of the SON 300'. In this manner, and as described above, the SON 300 or 300' can be dynamically scaleable, and, as described above, can self-heal (i.e., reroute, adjust settings/configurations of active and connected nodes or IoT devices in the SON, as necessary) if one or more IoT nodes, devices, or sensors in the SON is damaged, brought off line, or moved out of range of any of the other IoT nodes, devices, or sensors in the SON. In some cases, the SON can reorganize one or more sensors or one or more fields of sensors within the SON. In some cases, network functions virtualization ("NFV") may be implemented in conjunction with the SON, in which can virtual network functions ("VNFs") might be sent to one or more IoT-capable devices to enable particular network functions (dependent on the type and functions of the VNFs that are sent to and invoked in these devices), in a manner that is described in detail in at least the '208, '280, and '309 applications, the disclosures of which have already been incorporated herein by reference in their entirety for all purposes.

The first IoT-capable device 305, the second IoT-capable devices 315a-315h, and the computing system 330 of system 300 in FIG. 3 are otherwise similar, if not identical, to the first IoT-capable device 105, the second IoT-capable devices 115a-115n, and the computing system 130a, 130b, or 130c, respectively, of system 100 in FIG. 1 or system 200 in FIG. 2, and the descriptions of these components of system 100 or 200 are applicable to the corresponding components of system 300 or 300', respectively.

Figure 4:
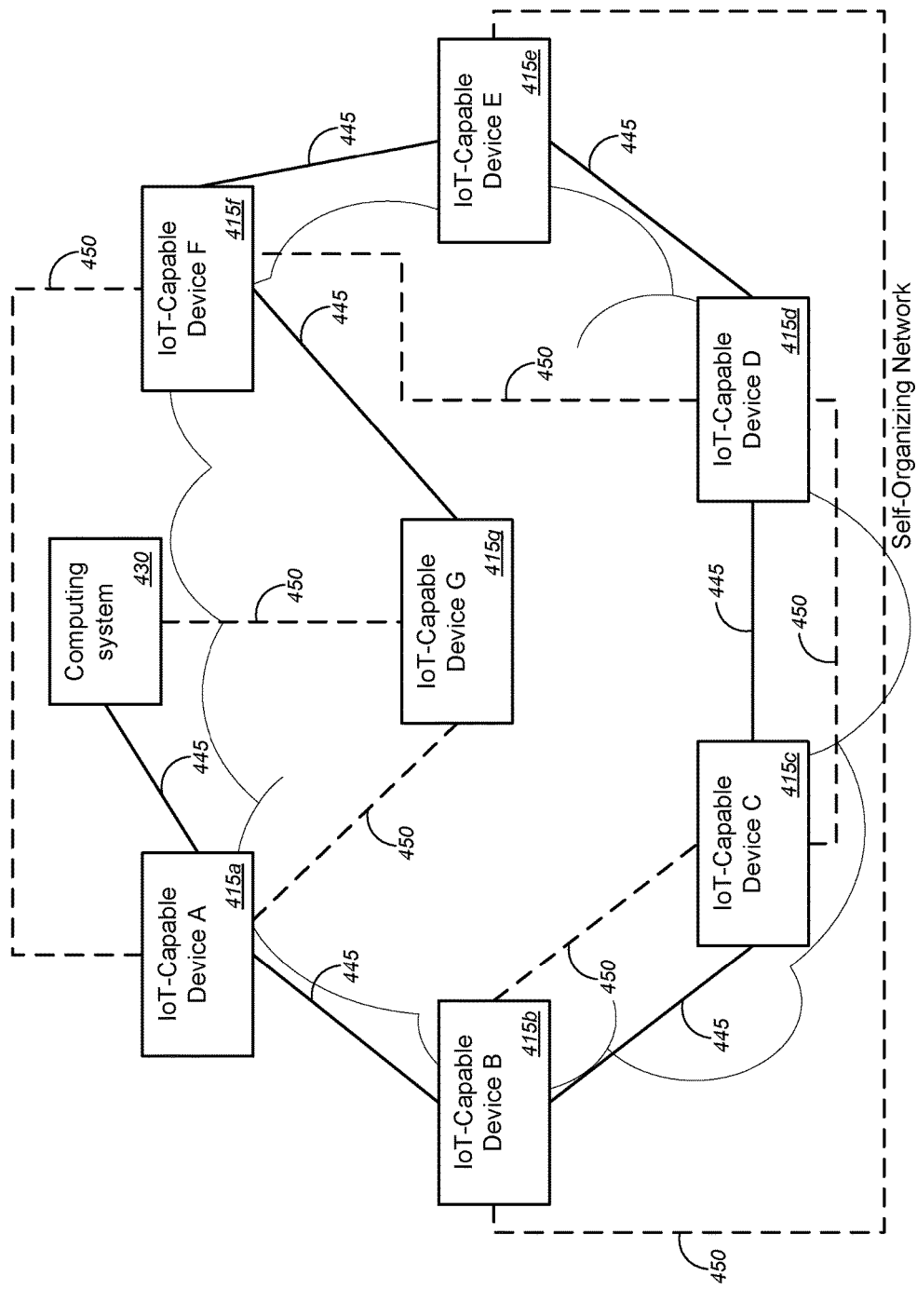
FIG. 4 is a schematic diagram illustrating an exemplary system in which there are multiple communications paths in the self-organizing network of IoT-capable devices to provide redundancy.

FIG. 4 is a schematic diagram illustrating an exemplary system in which there are multiple communications paths in the self-organizing network ("SON") 400 of IoT-capable devices to provide redundancy. In the non-limiting embodiment of FIG. 4, SON 400 might comprise IoT-capable devices A through G 415a-415g (collectively, "second IoT-capable devices 415," "IoT-capable devices 415," "devices 415," etc.; which might correspond to any of the first IoT-capable device 105, the one or more second IoT-capable devices 115a-115n, and/or the one or more third IoT-capable devices 125a-125n in FIGS. 1 and 2, or the like), and/or the like.

In some embodiments, a computing system 430 might autonomously identify or establish one or more network paths (e.g., network paths 445 (which is depicted in FIG. 4 as a solid line) and/or 450 (which is depicted in FIG. 4 as a dashed line)), in some cases, based at least in part on a simulation of different configurations of the plurality of IoT-capable devices 415, which simulation might, in some instances, be autonomously run by the computing system using virtualized instances of the plurality of IoT-capable devices that might be generated based on data regarding active IoT-capable devices 415 in the SON 400. The process of identifying the one or more network paths is described in detail below with respect to FIG. 6C, while the process of establishing the one or more network paths is an extension of the process described in FIG. 6C.

With specific reference to FIG. 4, a first network path 445 (shown as a solid line in FIG. 4) might be identified or established, by the computing system 430, between IoT-capable device A 415a and IoT-capable device G 415g, via IoT-capable devices B through F 415b-415f. The first network path 445 may be unidirectional from IoT-capable device A 415a to IoT-capable device G 415g, unidirectional from IoT-capable device G 415g to IoT-capable device A 415a, or bidirectional between IoT-capable device A 415a and IoT-capable device G 415g. In a similar manner, a second network path 450 (shown as a dashed line in FIG. 4) might be identified or established, by the computing system 430, between IoT-capable device G 415g and IoT-capable device E 415e, via IoT-capable devices A 415a, IoT-capable devices F 415f, IoT-capable devices D 415d, IoT-capable devices C 415c, and IoT-capable devices B 415b. The second network path 450 may be unidirectional from IoT-capable device G 415g to IoT-capable device E 415e, unidirectional from IoT-capable device E 415e to IoT-capable device G 415g, or bidirectional between IoT-capable device G 415g and IoT-capable device E 415e. As shown in the embodiment of FIG. 4, each node or IoT-capable device 415 (except the terminal ones, i.e., the starting or ending nodes such as IoT-capable device A 415a and IoT-capable device G 415g in the first network path 445 or IoT-capable device G 415g and IoT-capable device E 415e in the second network path 450, etc.) is connected to two other IoT-capable devices 415 for each network path 445 or 450. For example, IoT-capable device B 415b is connected via the first network path 445 to both IoT-capable device A 415a and IoT-capable device C 415c, while also being connected via the second network path 450 to both IoT-capable device C 415c and IoT-capable device E 415e.

In the case that only one network path can be established between a particular one of the IoT-capable devices 415 and at least one other of the IoT-capable devices 415 (rather than the two network paths 445 and 450 being shown in FIG. 4 to connect each IoT-capable device 415 (except the terminal ones), etc.), the computing system 430 might autonomously send a notification indicating a gap in the SON of the IoT-capable devices that should be addressed. Alternatively, or additionally, the computing system 430 might generate one or more control instructions, in response to determining that only one network path can be established between the one particular IoT-capable device 415 and the at least one other particular IoT-capable device 415, and might autonomously send the one or more control instructions to one or more of the IoT-capable devices 415 to implement one or more additional or redundant paths between the one particular IoT-capable device 415 and the at least one other particular IoT-capable device 415.

The IoT-capable devices 415 and the computing system 430 of system 400 in FIG. 4 are otherwise similar, if not identical, to the IoT-capable devices 105, 115a-115n, and/or 125a-125n and the computing system 130a, 130b, or 130c, respectively, of system 100 in FIG. 1 or system 200 in FIG. 2, and the descriptions of these components of system 100 or 200 are applicable to the corresponding components of system 400, respectively.

Figure 5:
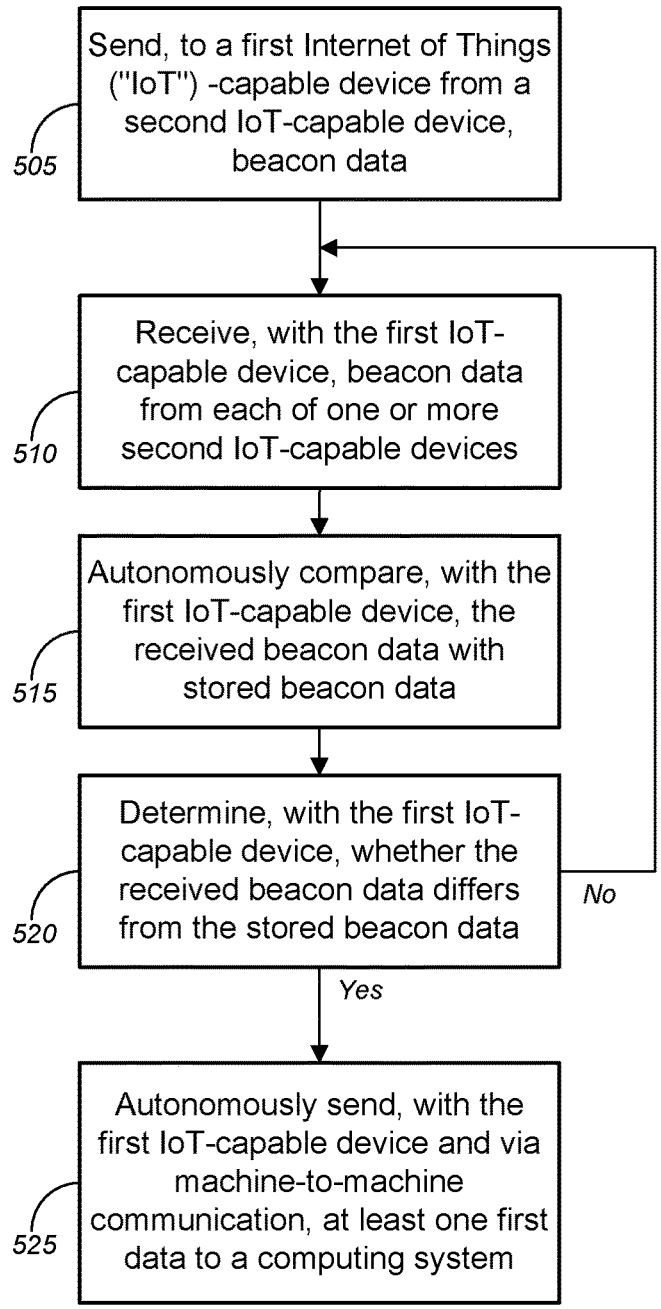
FIG. 5 is a flow diagram illustrating a method for implementing IoT self-organizing network functionality from the perspective of an IoT-capable device in the self-organizing network, in accordance with various embodiments.

FIG. 5 is a flow diagram illustrating a method 500 for implementing IoT self-organizing network functionality from the perspective of an IoT-capable device in the self-organizing network, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, 300, and 300' of FIGS. 1, 2, 3A, and 3B respectively (or components thereof), such methods may also be implemented using any suitable hardware (or software) implementation. Similarly, while each of the systems 100, 200, 300, and 300' of FIGS. 1, 2, 3A, and 3B, respectively (or components thereof), can operate according to the method 500 illustrated by FIG. 5 (e.g., by executing instructions embodied on a computer readable medium), the systems 100, 200, 300, and 300' of FIGS. 1, 2, 3A, and 3B can each also operate according to other modes of operation and/or perform other suitable procedures.

In the non-limiting embodiment of FIG. 5, method 500 might comprise, at block 505, sending beacon data (which might correspond to beacon data 335a-335h of FIGS. 3A and 3B, or the like) to a first Internet of Things ("IoT")-capable device (which might correspond to first IoT-capable device 105 and 305 of FIGS. 1-3, or the like) from each of one or more second IoT-capable devices (which might correspond to one or more second IoT-capable device 115, 115a-115n, and 315a-315h of FIGS. 1-3, or the like). The beacon data, according to some embodiments, might include, without limitation, at least one of a unique identifier (which might include, but is not limited to, at least one of Internet Protocol ("IP")-based (e.g., a unique IPv6 identifier, or the like), location based, or media access control identification ("MAC ID")-based, and/or the like) assigned to a particular one of the at least one second IoT-capable device, signal strength of the beacon data, geographic location information of the particular one of the at least one second IoT-capable device, relative location information of the particular one of the at least one second IoT-capable device with respect to other IoT-capable devices, communication transmit power level, or configuration parameters, and/or the like.

At block 510, method 500 might comprise receiving, with the first IoT-capable device, the beacon data from each of the one or more second IoT-capable devices. Method 500 might further comprise autonomously comparing, with the first IoT-capable device, the received beacon data with stored beacon data (block 510) and determining, with the first IoT-capable device, whether the received beacon data differs from the stored beacon data (block 520). In some embodiments, the stored beacon data might comprise beacon data that is stored in one or more tables in a local storage device (which might correspond to data store 225 of FIG. 2) of the first IoT-capable device.

Figure 6A:
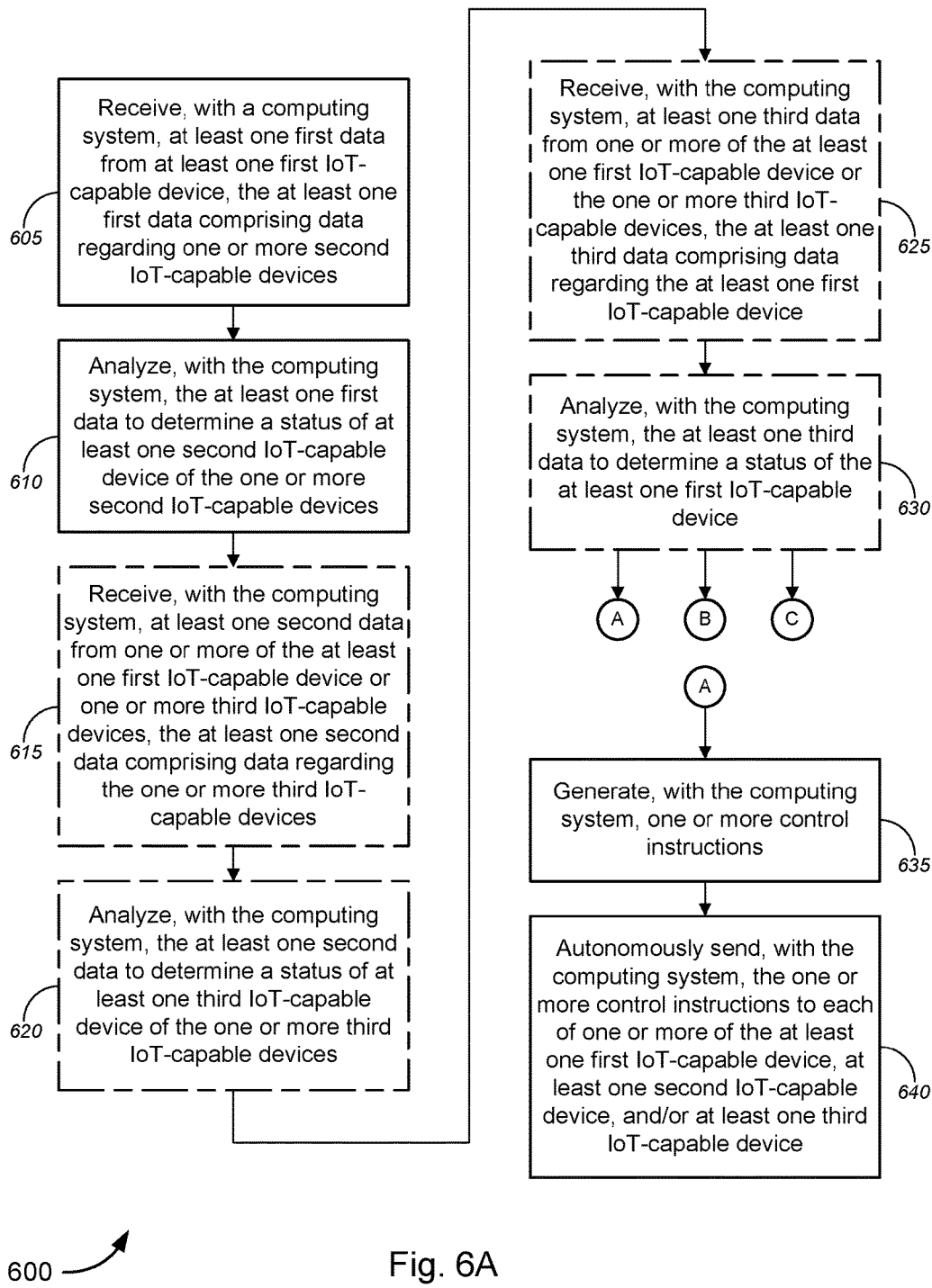
FIGS. 6A-6C are flow diagrams illustrating a method for implementing IoT self-organizing network functionality, in accordance with various embodiments.
Figure 6B:
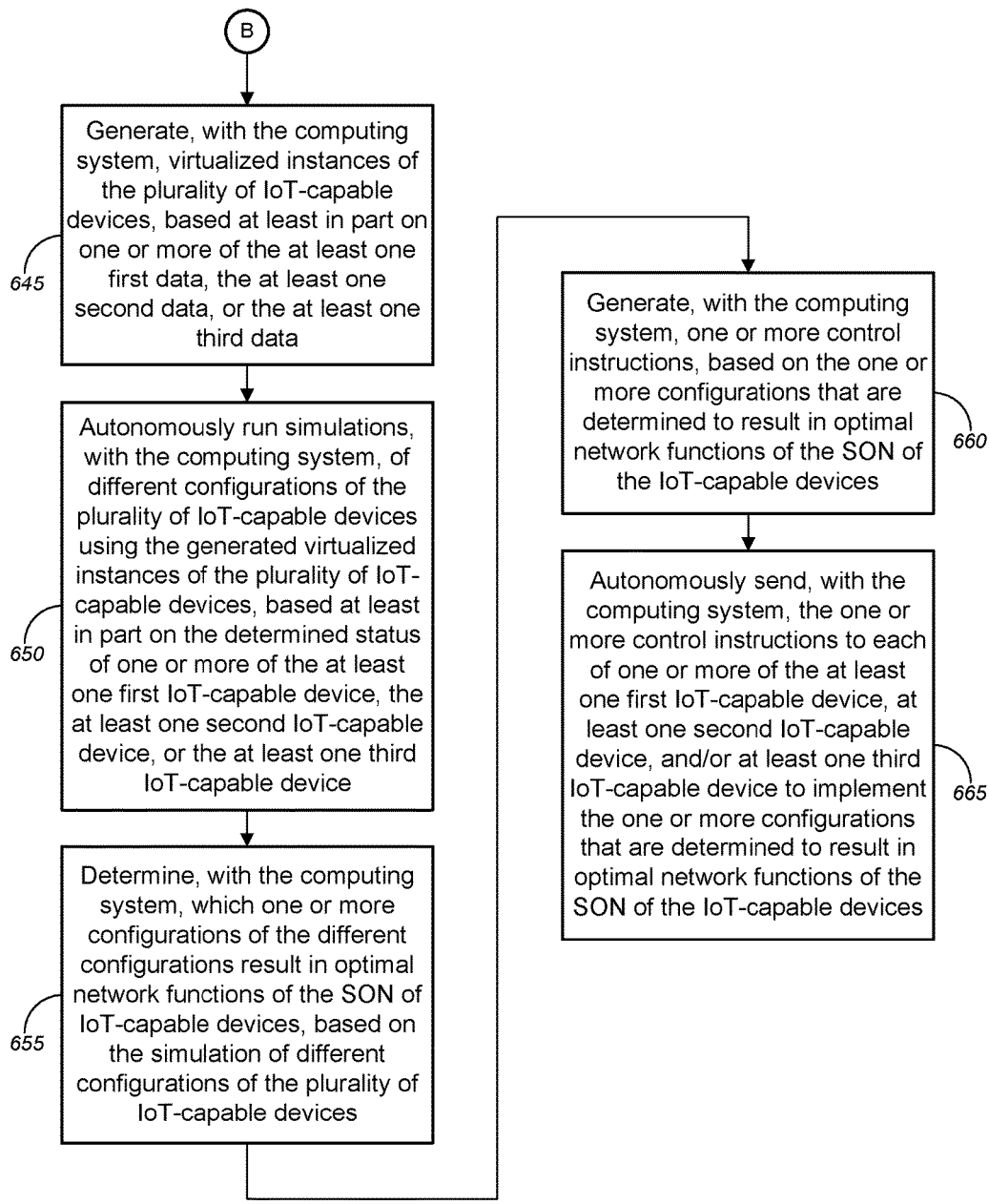
Figure 6C:
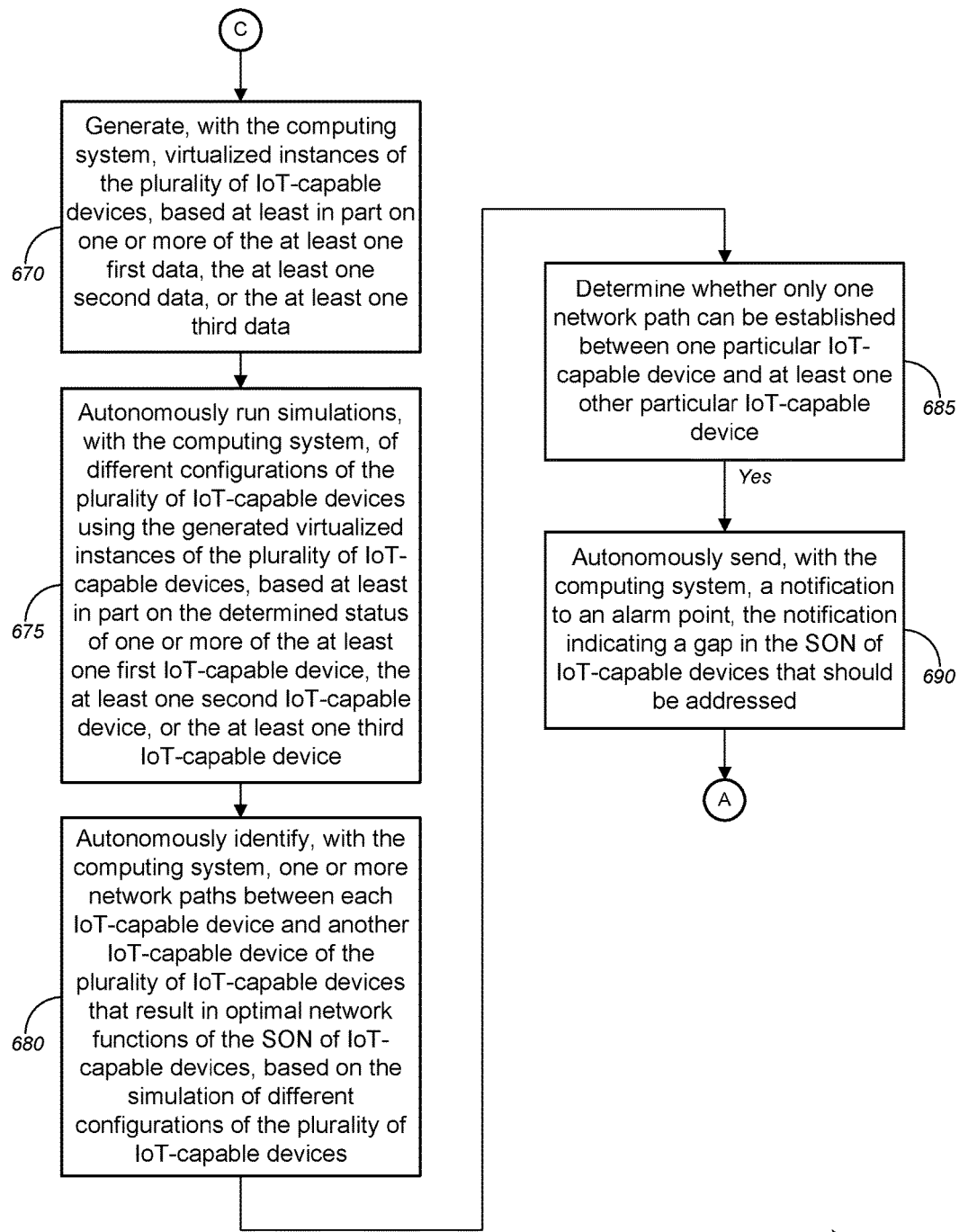

Based on a determination that the received beacon data differs from the stored beacon data (which might indicate at least one of a new IoT-capable device being detected, a previously known IoT-capable device having failed, a previously known IoT-capable device having been disabled, a previously known IoT-capable device having moved out of range, and/or the like), method 500 might comprise, at block 525, autonomously sending, with the first IoT-capable device and via machine-to-machine communications, at least one first data to a computing system (which might correspond to computing system 130a, 130b, 130c, 330, and 430 of FIGS. 1-4, or the like). Based on a determination that the received beacon data does not differ from the stored beacon data, method 500 might return to block 510. FIGS. 6A-6C below describe in detail various embodiments regarding how the computing system implements IoT self-organizing network functionality using the at least one first data that is sent from the first IoT-capable device.

FIGS. 6A-6C (collectively, "FIG. 6") are flow diagrams illustrating a method 600 for implementing IoT self-organizing network functionality, in accordance with various embodiments. FIG. 6A depicts the method for implementing IoT self-organizing network functionality, while FIG. 6B depicts the method for running simulations to determine configurations for achieving optimal network functions of the self-organizing network, and FIG. 6C depicts the method for running simulations to identify one or more network paths between each IoT-capable device and another IoT-capable device in the self-organizing network.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems 100, 200, 300, 300', and 4 of FIGS. 1, 2, 3A, 3B, and 4, respectively (or components thereof), such methods may also be implemented using any suitable hardware (or software) implementation. Similarly, while each of the systems 100, 200, 300, 300', and 4 of FIGS. 1, 2, 3A, 3B, and 4, respectively (or components thereof), can operate according to the method 600 illustrated by FIG. 6 (e.g., by executing instructions embodied on a computer readable medium), the systems 100, 200, 300, 300', and 4 of FIGS. 1, 2, 3A, 3B, and 4 can each also operate according to other modes of operation and/or perform other suitable procedures.

In FIG. 6A, method 600, at block 605 might comprise receiving, with a computing system (which might correspond to computing system 130a, 130b, 130c, 330, and 430 of FIGS. 1-4, or the like), at least one first data from at least one first Internet of Things ("IoT")-capable device (which might correspond to first IoT-capable device 105 and 305 of FIGS. 1-3, or the like) of a plurality of IoT-capable devices, the at least one first data comprising data regarding one or more second IoT-capable devices (which might correspond to one or more second IoT-capable device 115, 115a-115n, and 315a-315h of FIGS. 1-3, or the like) of the plurality of IoT-capable devices of a self-organizing network ("SON") of IoT-capable devices (which might correspond to SON 300, 300', and 400 of FIGS. 3A, 3B, and 4, or the like). In some embodiments, the computing system might be or might include, without limitation, at least one of a SON server, a service provider server, a gateway device, a computing node, a cloud computing system, a remote distributed computing system, or a distributed computing system that integrates computing resources from two or more IoT-capable devices of the plurality of IoT-capable devices, and/or the like. In some cases, the SON server might be one of a physical platform in a network or a virtualized instance in the network, or the like. In some instances, the at least one first data might comprise data regarding any new IoT-capable devices, any previously known IoT-capable devices that have now failed, any previously known IoT-capable devices have now been disabled, any previously known IoT-capable devices have now moved out of range, and/or the like.

According to some embodiments, the plurality of IoT-capable devices might include, but are not limited to, at least one of one or more household appliances, one or more kitchen appliances, one or more user devices, one or more vehicles, one or more wireless access points, one or more sensor devices, a gateway device, or an IoT human interface device, and/or the like. In some cases, the one or more sensor devices might include, without limitation, at least one of one or more temperature sensors, one or more particulate sensors, one or more light sensors, one or more air quality sensors, one or more humidity sensors, one or more proximity sensors, one or more location sensors, one or more location beacons, one or more object identifier beacons, one or more flame detectors, one or more atmospheric oxygen level monitors, one or more atmospheric carbon dioxide level monitors, one or more atmospheric nitrogen level monitors, one or more atmospheric pressure sensors, one or more carbon monoxide sensors, one or more smoke detectors, one or more toxicity monitors, one or more carcinogen detectors, one or more radiation sensors, one or more telecommunications signal sensors, one or more audio sensors, one or more sound amplitude sensors, one or more frequency sensors, one or more accelerometers, one or more moisture sensors, one or more motion sensors, one or more wind sensors, one or more weather sensors, one or more seismic sensors, one or more cameras, one or more biometrics sensors, one or more water leak detectors, or one or more contact sensors, and/or the like.

Method 600, at block 610, might comprise analyzing, with the computing system, the at least one first data to determine a status of at least one second IoT-capable device of the one or more second IoT-capable devices. In some cases, method 600 might further comprise receiving, with the computing system, at least one second data from one or more of the at least one first IoT-capable device and/or the one or more third IoT-capable devices (optional block 615), and analyzing, with the computing system, the at least one second data to determine a status of at least one third IoT-capable device of the one or more third IoT-capable devices (optional block 620). The at least one second data might comprise data regarding the one or more third IoT-capable devices. Alternatively, or additionally, method 600 might comprise receiving, with the computing system at least one third data from one or more of the at least one first IoT-capable device and/or the one or more third IoT-capable devices (optional block 625), and analyzing, with the computing system, the at least one third data to determine a status of the at least one first IoT-capable device (optional block 630). The at least one third data might comprise data regarding the one or more first IoT-capable device. The process might continue to one or more of: block 635 in FIG. 6A following the circular marker denoted, "A"; block 645 in FIG. 6B following the circular marker denoted, "B"; and/or block 670 in FIG. 6C following the circular marker denoted, "C."

At block 635 (following the circular marker denoted, "A"), method 600 might comprise generating, with the computing system, one or more control instructions, based at least in part on one or more of the determined status of each of the at least one first IoT-capable device (if applicable), the at least one second IoT-capable device, and/or the at least one third IoT-capable device (if applicable). Method 600 might further comprise, at block 640, autonomously sending, with the computing system, the one or more control instructions to one or more of the at least one first IoT-capable device, the at least one second IoT-capable device, and/or the at least one third IoT-capable device, based at least in part on one or more of the determined status of each of the at least one first IoT-capable device (if applicable), the at least one second IoT-capable device, and/or the at least one third IoT-capable device (if applicable).

With reference to FIG. 6B, method 600, at block 645 (following the circular marker denoted, "B," after optional block 630), might comprise generating, with the computing system, virtualized instances of the plurality of IoT-capable devices, based at least in part on one or more of the at least one first data, the at least one second data (if applicable), and/or the at least one third data (if applicable). Method 600 might further comprise autonomously running simulations, with the computing system, of different configurations of the plurality of IoT-capable devices using the generated virtualized instances of the plurality of IoT-capable devices, based at least in part on one or more of the determined status of each of the at least one first IoT-capable device (if applicable), the at least one second IoT-capable device, and/or the at least one third IoT-capable device (if applicable) (block 650). At block 655, method 600 might comprise determining, with the computing system, which one or more configurations of the different configurations result in optimal network functions of the self-organizing network ("SON") of the IoT-capable devices, based at least in part on the simulation of different configurations of the plurality of IoT-capable devices.

Method 600 might further comprise generating, with the computing system, one or more control instructions, based at least in part on the one or more configurations that are determined to result in optimal network functions of the SON of the IoT-capable devices (block 660), and autonomously sending, with the computing system, the one or more control instructions to one or more of the at least one first IoT-capable device, the at least one second IoT-capable device, and/or the at least one third IoT-capable device to implement one or more configurations that are determined to result in optimal network functions of the SON of the IoT-capable devices (block 665).

Merely by way of example, according to some embodiments, as shown in FIG. 6C, method 600, at block 670 (following the circular marker denoted, "C," after optional block 630), might comprise generating, with the computing system, virtualized instances of the plurality of IoT-capable devices, based at least in part on one or more of the at least one first data, the at least one second data (if applicable), and/or the at least one third data (if applicable). Method 600 might further comprise autonomously running simulations, with the computing system, of different configurations of the plurality of IoT-capable devices using the generated virtualized instances of the plurality of IoT-capable devices, based at least in part on one or more of the determined status of each of the at least one first IoT-capable device (if applicable), the at least one second IoT-capable device, and/or the at least one third IoT-capable device (if applicable) (block 675). At block 680, method 600 might comprise autonomously identifying, with the computing system, one or more network paths (which might correspond, e.g., to network paths 445 and 450 of FIG. 4, or the like) between each IoT-capable device and another IoT-capable device that result in optimal network functions of the SON of the IoT-capable devices, based at least in part on the simulation of different configurations of the plurality of IoT-capable devices.

Method 600 might further comprise, at block 685, determining, with the computing system, whether only one network path can be established between one particular IoT-capable device and at least one other particular IoT-capable device. If so, method 600 might, at block 690, comprise autonomously sending, with the computing system, a notification indicating a gap in the SON of the IoT-capable devices that should be addressed. In some embodiments, method 600 might proceed to block 635 following the circular marker denoted, "A." In such embodiments, generating the one or more control instructions (at block 635) might comprise generating, with the computing system, one or more control instructions, in response to determining that only one network path can be established between the one particular IoT-capable device and the at least one other particular IoT-capable device, while autonomously sending the one or more control instructions (at block 640) might comprise autonomously sending, with the computing system, the one or more control instructions to one or more of the at least one first IoT-capable device, the at least one second IoT-capable device, and/or the at least one third IoT-capable device to implement one or more additional or redundant paths between the one particular IoT-capable device and the at least one other particular IoT-capable device.

According to some embodiments, although simulations on virtual IoT devices may help determine where best to establish redundant paths, redundant paths can also be established without the use of virtual IoT devices.

Exemplary System and Hardware Implementation

Figure 7:
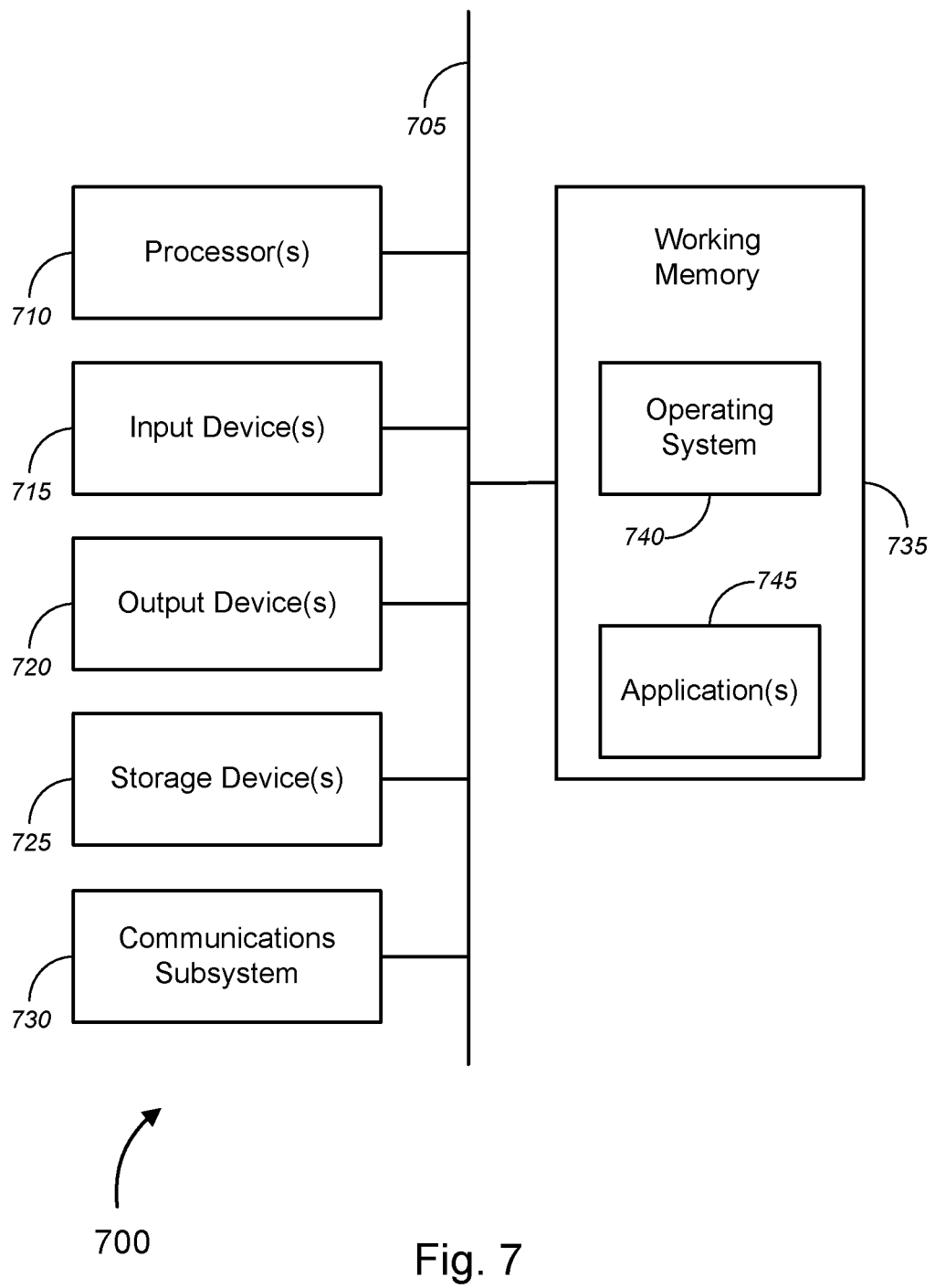
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., First Internet of Things ("IoT") devices 105 and 305, sensors 110a-110n, 120a-120n, and 235-280, Second IoT-capable devices 115, 115a-115n, and 315a-315h, Third IoT-capable devices 125a-125n, computing system 130a, 130b, 330, and 430, gateway 130c, IoT-capable devices 415a-415g, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., First Internet of Things ("IoT") devices 105 and 305, sensors 110a-110n, 120a-120n, and 235-280, Second IoT-capable devices 115, 115a-115n, and 315a-315h, Third IoT-capable devices 125a-125n, computing system 130a, 130b, 330, and 430, gateway 130c, IoT-capable devices 415a-415g, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
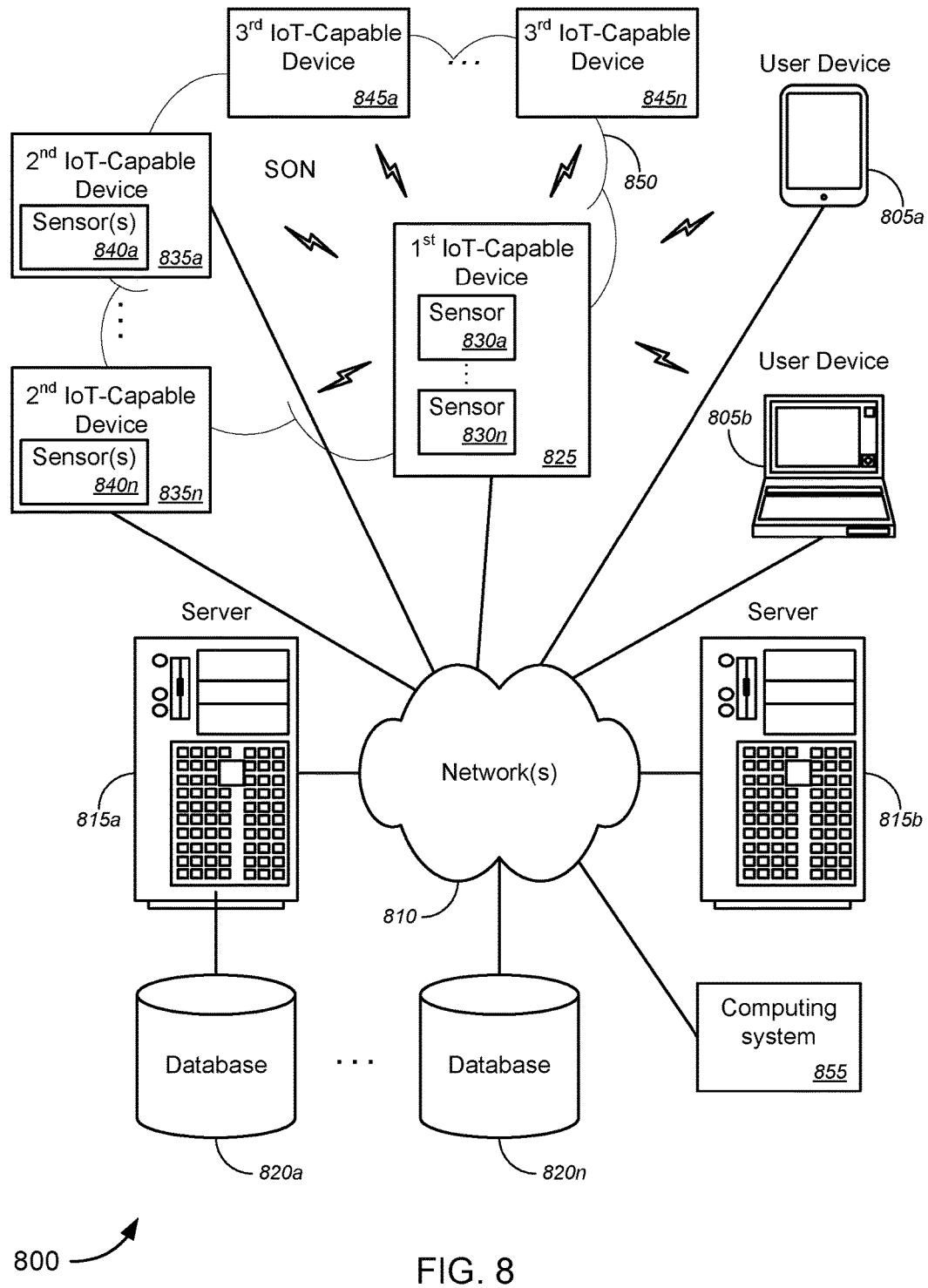
FIG. 8 is a block diagram illustrating an example of a networked system of computers, computing systems, or system hardware architecture, which can be used in accordance with various embodiments.

As noted above, a set of embodiments comprises methods and systems for implementing Internet of Things functionality, and, in particular embodiments, to methods, systems, apparatus, and computer software for implementing Internet of Things ("IoT") self-organizing network functionality. FIG. 8 illustrates a schematic diagram of a system 800 that can be used in accordance with various embodiments. The system 800 can each include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 810 (similar to networks 135 of FIGS. 1 and 2, or the like), as well as the self-organizing network 850 (similar to self-organizing networks 300, 300', and 400 of FIGS. 3A, 3B, and 4, or the like), can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing Internet of Things functionality, and, in particular embodiments, to methods, systems, apparatus, and computer software for implementing Internet of Things ("IoT") self-organizing network functionality, or the like, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

With reference to FIG. 8, according to some embodiments, system 800 might further comprise a first IoT-capable device 825 (similar to first IoT-capable device 105 and 305 of FIGS. 1-3, or the like), one or more sensors 830a-830n disposed in the first IoT-capable device 825 (similar to sensors 110a-110n, 120a-120n, and 235-280 of FIGS. 1 and 2, or the like), one or more second IoT-capable devices 835a-835n (similar to second IoT-capable devices 115, 115a-115n, and 315a-315h of FIGS. 1-3, or the like), one or more sensors 840a-840n respectively disposed in the second IoT-capable devices 835a-835n (similar to sensors 110a-110n, 120a-120n, and 235-280 of FIGS. 1 and 2, or the like), one or more third IoT-capable devices 845a-845n (similar to third IoT-capable devices 125a-125n of FIGS. 1 and 2, or the like), and self-organizing network 850 that comprises the first IoT-capable device 825, the one or more second IoT-capable devices 835a-835n, and the one or more third IoT-capable devices 845a-845n. System 800 might further comprise a computing system 855 (similar to computing system 130a, 130b, 130c, 330, and 430 of FIGS. 1-4, or the like).

In operation, the first IoT-capable device 825 might receive beacon data from each of the one or more second IoT-capable devices 835a-835n, might autonomously compare the received beacon data with stored beacon data, and might determine whether the received beacon data differs from the stored beacon data (e.g., if a new IoT-capable device is detected, if a previously known IoT-capable device has failed, if a previously known IoT-capable device has been disabled, if a previously known IoT-capable device has moved out of range, etc.). Based on a determination that the received beacon data differs from the stored beacon data, the first IoT-capable device 825 might autonomously send at least one first data to a computing system (which might be embodied by servers 815a and 815b, or computing system 855, or the like). The at least one first data might comprise data regarding the one or more second IoT-capable devices 835a-835n and/or regarding any new IoT-capable devices, any previously known IoT-capable devices that have now failed, any previously known IoT-capable devices have now been disabled, any previously known IoT-capable devices have now moved out of range, and/or the like.

The computing system might receive the at least one first data, and might analyze the at least one first data to determine a status of at least one second IoT-capable device 835 of the one or more second IoT-capable devices 835a-835n. In some cases, the computing system might also receive at least one second data from one or more of the at least one first IoT-capable device 825 and/or the one or more third IoT-capable devices 845a-845n, and might analyze the at least one second data to determine a status of at least one third IoT-capable device 845 of the one or more third IoT-capable devices 845a-845n, the at least one second data comprising data regarding the one or more third IoT-capable devices 845a-845n. Alternatively, or additionally, the computing system might receive at least one third data from one or more of the at least one first IoT-capable device 825 and/or the one or more third IoT-capable devices 845a-845n, and might analyze the at least one third data to determine a status of the at least one first IoT-capable device 825, the at least one third data comprising data regarding the one or more first IoT-capable device 825.

The computing system might subsequently generate one or more control instructions, based at least in part on the determined status of each of one or more of the at least one first IoT-capable device 825, the at least one second IoT-capable device 835, and/or the at least one third IoT-capable device 845, and might autonomously send the one or more control instructions to one or more of the at least one first IoT-capable 825 device or the at least one third IoT-capable device 845, based at least in part on the determined status of each of one or more of the at least one first IoT-capable device 825, the at least one second IoT-capable device 835, and/or the at least one third IoT-capable device 845.

In some embodiments, the computing system might generate virtualized instances of the plurality of IoT-capable devices, based at least in part on one or more of the at least one first data, the at least one second data, and/or the at least one third data, and might autonomously run simulations of different configurations of the plurality of IoT-capable devices using the generated virtualized instances of the plurality of IoT-capable devices, based at least in part on the determined status of each of one or more of the at least one first IoT-capable device 825, the at least one second IoT-capable device 835, and/or the at least one third IoT-capable device 845. The computing system might determine which one or more configurations of the different configurations result in optimal network functions of the SON 850 of the IoT-capable devices, based at least in part on the simulation of different configurations of the plurality of IoT-capable devices. The computing system might subsequently generate one or more control instructions, based at least in part on the one or more configurations that are determined to result in optimal network functions of the SON 850 of the IoT-capable devices, and might autonomously send the one or more control instructions to one or more of the at least one first IoT-capable 825 device, the at least one second IoT-capable device 835, and/or the at least one third IoT-capable device 845 to implement the one or more configurations that are determined to result in optimal network functions of the SON 850 of the IoT-capable devices.

Merely by way of example, according to some embodiments, the computing system might generate virtualized instances of the plurality of IoT-capable devices, based at least in part on one or more of the at least one first data, the at least one second data, and/or the at least one third data, and might autonomously run simulations of different configurations of the plurality of IoT-capable devices using the generated virtualized instances of the plurality of IoT-capable devices, based at least in part on the determined status of each of one or more of the at least one first IoT-capable device 825, the at least one second IoT-capable device 835, and/or the at least one third IoT-capable device 845. The computing system might autonomously identify one or more network paths between each IoT-capable device and another IoT-capable device that result in optimal network functions of the SON 850 of the IoT-capable devices, based at least in part on the simulation of different configurations of the plurality of IoT-capable devices. The computing system might subsequently determine whether only one network path can be established between one particular IoT-capable device and at least one other particular IoT-capable device. If so, the computing system might autonomously send a notification indicating a gap in the SON 850 of the IoT-capable devices that should be addressed. In some embodiments, the computing system might also generate one or more control instructions, in response to determining that only one network path can be established between the one particular IoT-capable device and the at least one other particular IoT-capable device, and might autonomously send the one or more control instructions to one or more of the at least one first IoT-capable 825 device, the at least one second IoT-capable device 835, and/or the at least one third IoT-capable device 845 to implement one or more additional or redundant paths between the one particular IoT-capable device and the at least one other particular IoT-capable device. These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing Internet of Things ("IoT") self-organizing network functionality, comprising:
   receiving, with a computing system, at least one first data from at least one first IoT-capable device of a plurality of IoT-capable devices, the at least one first data comprising data regarding one or more second IoT-capable devices of the plurality of IoT-capable devices of a self-organizing network ("SON") of IoT-capable devices;
   analyzing, with the computing system, the at least one first data to determine a status of at least one second IoT-capable device of the one or more second IoT-capable devices;

based at least in part on the determined status of the at least one second IoT-capable device, generating, with the computing system, one or more control instructions; and autonomously sending, with the computing system, the one or more control instructions to one or more third IoT-capable devices of the plurality of IoT-capable devices, based at least in part on the determined status of the at least one second IoT-capable device, the one or more control instructions causing each of the one or more third IoT-capable devices to change at least one of its device settings, its device configurations, its network configurations, or its functions within the SON of IoT-capable devices.

2. The method of claim 1, wherein the computing system is at least one of a SON server, a service provider server, a gateway device, a computing node, a cloud computing system, a remote distributed computing system, or a distributed computing system that integrates computing resources from two or more IoT-capable devices of the plurality of IoT-capable devices, wherein the SON server is one of a physical platform in a network or a virtualized instance in the network.

3. The method of claim 1, wherein the plurality of IoT-capable devices comprises at least one of one or more household appliances, one or more kitchen appliances, one or more user devices, one or more vehicles, one or more wireless access points, one or more sensor devices, a gateway device, one or more wireless access points ("WAPs"), or an IoT human interface device.

4. The method of claim 1, further comprising:
receiving, with the computing system, at least one second data from one or more of the at least one first IoT-capable device or the one or more third IoT-capable devices, the at least one second data comprising data regarding the one or more third IoT-capable devices; and
analyzing, with the computing system, the at least one second data to determine a status of at least one third IoT-capable device of the one or more third IoT-capable devices;
wherein generating the one or more control instructions and autonomously sending the one or more control instructions comprise generating, with the computing system, one or more control instructions, based at least in part on the determined status of each of the at least one second IoT-capable device and the at least one third IoT-capable device, and autonomously sending, with the computing system, the one or more control instructions to the at least one third IoT-capable device, based at least in part on the determined status of each of the at least one second IoT-capable device and the at least one third IoT-capable device.

5. The method of claim 4, wherein the one or more third IoT-capable devices comprise the at least one first IoT-capable device, wherein the method further comprises:
receiving, with the computing system, at least one third data from one or more of the at least one first IoT-capable device or the one or more third IoT-capable devices, the at least one third data comprising data regarding the at least one first IoT-capable device; and
analyzing, with the computing system, the at least one third data to determine a status of the at least one first IoT-capable device;
wherein generating the one or more control instructions and autonomously sending the one or more control instructions comprise generating, with the computing system, one or more control instructions, based at least in part on the determined status of each of the at least one first IoT-capable device, the at least one second IoT-capable device, and the at least one third IoT-capable device, and autonomously sending, with the computing system, the one or more control instructions to one or more of the at least one first IoT-capable device or the at least one third IoT-capable device, based at least in part on the determined status of each of the at least one first IoT-capable device, the at least one second IoT-capable device, and the at least one third IoT-capable device.

6. The method of claim 5, further comprising:
generating, with the computing system, virtualized instances of the plurality of IoT-capable devices, based at least in part on one or more of the at least one first data, the at least one second data, or the at least one third data;
autonomously running simulations, with the computing system, of different configurations of the plurality of IoT-capable devices using the generated virtualized instances of the plurality of IoT-capable devices, based at least in part on the determined status of one or more of the at least one first IoT-capable device, the at least one second IoT-capable device, or the at least one third IoT-capable device; and
determining, with the computing system, which one or more configurations of the different configurations result in optimal network functions of the SON of IoT-capable devices, based at least in part on the simulation of different configurations of the plurality of IoT-capable devices;
wherein the one or more control instructions cause each of the one or more of the at least one first IoT-capable device or the at least one third IoT-capable device to change at least one of its device settings, its device configurations, its network configurations, or its functions within the SON of IoT-capable devices to implement the one or more configurations of the different configurations that are determined to result in optimal network functions of the SON of IoT-capable devices.

7. The method of claim 5, further comprising:
generating, with the computing system, virtualized instances of the plurality of IoT-capable devices, based at least in part on one or more of the at least one first data, the at least one second data, or the at least one third data;
autonomously running simulations, with the computing system, of different configurations of the plurality of IoT-capable devices using the generated virtualized instances of the plurality of IoT-capable devices, based at least in part on the determined status of one or more of the at least one first IoT-capable device, the at least one second IoT-capable device, or the at least one third IoT-capable device;
autonomously identifying, with the computing system, one or more network paths between each IoT-capable device and another IoT-capable device of the plurality of IoT-capable devices that result in optimal network functions of the SON of IoT-capable devices, based at least in part on the simulation of different configurations of the plurality of IoT-capable devices; and
based on a determination that only one network path can be established between one particular IoT-capable device and at least one other particular IoT-capable device, autonomously sending, with the computing system, a notification to an alarm point, the notification indicating a gap in the SON of IoT-capable devices that should be addressed.

8. The method of claim 1, wherein the determined status of the at least one second IoT-capable device comprises one of new device, device failure, disabled device, or out-of-range device.

9. The method of claim 1, wherein the at least one first IoT-capable device receives beacon data from each of at least one second IoT-capable device of the one or more second IoT-capable devices, wherein the data regarding the one or more second IoT-capable devices comprises the beacon data from each of the at least one second IoT-capable device.

10. The method of claim 9, wherein the beacon data from each of the at least one second IoT-capable device comprises at least one of a unique identifier assigned to a particular one of the at least one second IoT-capable device, signal strength of the beacon data, geographic location information of the particular one of the at least one second IoT-capable device, relative location information of the particular one of the at least one second IoT-capable device with respect to other IoT-capable devices, communication transmit power level, or configuration parameters.

11. A system for implementing Internet of Things ("IoT") self-organizing network functionality, comprising:
a plurality of IoT-capable devices comprising at least one first IoT-capable device, one or more second IoT-capable devices, and one or more third IoT-capable devices, each of the at least one first IoT-capable device comprising:
at least one first processor;
at least one first transceiver; and
a first non-transitory computer readable medium communicatively coupled to the at least one first processor, the first non-transitory computer readable medium having stored thereon computer software comprising a first set of instructions that, when executed by the at least one first processor, causes the first IoT-capable device to:
receive at least one first data regarding the one or more second IoT-capable devices; and
send the at least one first data to a computing system via the at least one first transceiver;
the computing system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the computing system to:
receive the at least one first data from the at least one first IoT-capable device;
analyze the at least one first data to determine a status of at least one second IoT-capable device of the one or more second IoT-capable devices;
based at least in part on the determined status of the at least one second IoT-capable device, generate one or more control instructions; and
autonomously send the one or more control instructions to the one or more third IoT-capable devices of the plurality of IoT-capable devices, based at least in part on the determined status of the at least one second IoT-capable device;

wherein each of the one or more third IoT-capable devices comprises:
at least one third processor;
at least one third transceiver; and
a third non-transitory computer readable medium communicatively coupled to the at least one third processor, the third non-transitory computer readable medium having stored thereon computer software comprising a third set of instructions that, when executed by the at least one third processor, causes the third IoT-capable device to:
receive the one or more control instructions; and
change at least one of its device settings, its device configurations, its network configurations, or its functions within the SON of IoT-capable devices, based at least in part on the one or more control instructions.

12. The system of claim 11, wherein the computing system is at least one of a SON server, a service provider server, a gateway device, a computing node, a cloud computing system, a remote distributed computing system, or a distributed computing system that integrates computing resources from two or more IoT-capable devices of the plurality of IoT-capable devices, wherein the SON server is one of a physical platform in a network or a virtualized instance in the network.

13. The system of claim 11, wherein the plurality of IoT-capable devices comprises at least one of one or more household appliances, one or more kitchen appliances, one or more user devices, one or more vehicles, one or more wireless access points, one or more sensor devices, a gateway device, or an IoT human interface device.

14. The system of claim 13, wherein the one or more sensor devices comprises at least one of one or more temperature sensors, one or more particulate sensors, one or more light sensors, one or more air quality sensors, one or more humidity sensors, one or more proximity sensors, one or more location sensors, one or more location beacons, one or more object identifier beacons, one or more flame detectors, one or more atmospheric oxygen level monitors, one or more atmospheric carbon dioxide level monitors, one or more atmospheric nitrogen level monitors, one or more atmospheric pressure sensors, one or more carbon monoxide sensors, one or more smoke detectors, one or more toxicity monitors, one or more carcinogen detectors, one or more radiation sensors, one or more telecommunications signal sensors, one or more audio sensors, one or more sound amplitude sensors, one or more frequency sensors, one or more accelerometers, one or more moisture sensors, one or more motion sensors, one or more wind sensors, one or more weather sensors, one or more seismic sensors, one or more cameras, one or more biometrics sensors, one or more water leak detectors, or one or more contact sensors.

15. The system of claim 11, wherein the determined status of the at least one second IoT-capable device comprises one of new device, device failure, disabled device, or out-of-range device.

16. The system of claim 11, wherein the at least one first IoT-capable device receives beacon data from each of at least one second IoT-capable device of the one or more second IoT-capable devices, wherein the data regarding the one or more second IoT-capable devices comprises the beacon data from each of the at least one second IoT-capable device.

17. The system of claim 16, wherein the beacon data from each of the at least one second IoT-capable device comprises at least one of a unique identifier assigned to a particular one of the at least one second IoT-capable device, signal strength of the beacon data, geographic location information of the particular one of the at least one second IoT-capable device, relative location information of the particular one of the at least one second IoT-capable device with respect to other IoT-capable devices, communication transmit power level, or configuration parameters.

18. A method for implementing Internet of Things ("IoT") self-organizing network functionality, comprising:

receiving, with a first IoT-capable device of a plurality of IoT-capable devices, beacon data from each of one or more second IoT-capable devices of the plurality of IoT-capable devices;

autonomously comparing, with the first IoT-capable device, the received beacon data from the one or more second IoT-capable devices with stored beacon data for one or more third IoT-capable devices of the plurality of IoT-capable devices, at least one of the one or more second IoT-capable devices and at least one of the one or more third IoT-capable devices being the same device; and based on a determination that the received beacon data differs from the stored beacon data, autonomously sending, with the first IoT-capable device, at least one first data to a computing system, the at least one first data comprising data regarding at least one of the one or more second IoT-capable devices, the one or more third IoT-capable device, a change in status of at least one second IoT-capable device of the one or more second IoT-capable devices, or a change in status of at least one third IoT-capable device of the one or more third IoT-capable devices.

19. The method of claim 18, wherein the beacon data from each of the one or more second IoT-capable devices comprises at least one of a unique identifier assigned to a particular one of the one or more second IoT-capable devices, signal strength of the beacon data, geographic location information of the particular one of the one or more second IoT-capable devices, relative location information of the particular one of the one or more second IoT-capable devices with respect to other IoT-capable devices, communication transmit power level, or configuration parameters.

20. The method of claim 18, wherein the stored beacon data comprises beacon data that is stored in one or more tables in a local storage device of the first IoT-capable device.

21. The method of claim 18, wherein the change in status of the at least one second IoT-capable device and the change in status of at least one third IoT-capable device each indicates a current status comprising one of new device, device failure, disabled device, or out-of-range device.

22. An Internet of Things ("IoT") device of a plurality of IoT-capable devices, comprising:

at least one processor;
one or more sensors;
at least one transceiver; and
a non-transitory computer readable medium communicatively coupled to the at least one processor, the non-transitory computer readable medium having stored thereon computer software comprising a set of instructions that, when executed by the at least one processor, causes the IoT-capable device to:

receive beacon data from each of one or more second IoT-capable devices of the plurality of IoT-capable devices;

autonomously compare the received beacon data from the one or more second IoT-capable devices with stored beacon data for one or more third IoT-capable devices of the plurality of IoT-capable devices, at least one of the one or more second IoT-capable devices and at least one of the one or more third IoT-capable devices being the same device; and based on a determination that the received beacon data differs from the stored beacon data, autonomously send at least one first data to a computing system, the at least one first data comprising data regarding at least one of the one or more second IoT-capable devices, the one or more third IoT-capable device, a change in status of at least one second IoT-capable device of the one or more second IoT-capable devices, or a change in status of at least one third IoT-capable device of the one or more third IoT-capable devices.

23. The IoT device of claim 22, wherein the beacon data from each of the one or more second IoT-capable devices comprises at least one of a unique identifier assigned to a particular one of the one or more second IoT-capable devices, signal strength of the beacon data, geographic location information of the particular one of the one or more second IoT-capable devices, relative location information of the particular one of the one or more second IoT-capable devices with respect to other IoT-capable devices, communication transmit power level, or configuration parameters.

24. The IoT device of claim 22, further comprising a local storage device, wherein the stored beacon data comprises beacon data that is stored in one or more tables in the local storage device of the IoT-capable device.

25. The IoT device of claim 22, wherein the change in status of the at least one second IoT-capable device and the change in status of at least one third IoT-capable device each indicates a current status comprising one of new device, device failure, disabled device, or out-of-range device.

26. The IoT device of claim 22, wherein the plurality of IoT-capable devices comprises at least one of one or more household appliances, one or more kitchen appliances, one or more user devices, one or more vehicles, one or more wireless access points, one or more sensor devices, a gateway device, or an IoT human interface device.

* * * * *